United States Patent [19]

Jahnke et al.

[11] Patent Number: 5,518,517
[45] Date of Patent: May 21, 1996

[54] WATER-IN-OIL EMULSION FERTILIZER COMPOSITIONS

[75] Inventors: Richard W. Jahnke; John W. Forsberg, both of Mentor; Nils O. Pearson, Lyndhurst, all of Ohio

[73] Assignee: The Lubrizol Corporation, Wickliffe, Ohio

[21] Appl. No.: 337,804

[22] Filed: Nov. 14, 1994

[51] Int. Cl.$^6$ .................................................. C05G 5/00
[52] U.S. Cl. .................................... 71/64.08; 71/64.11
[58] Field of Search ................................ 71/64.08, 64.11

[56] References Cited

U.S. PATENT DOCUMENTS

| | | | |
|---|---|---|---|
| 3,255,108 | 6/1966 | Wiese | 252/32.7 |
| 3,269,946 | 8/1966 | Wiese | 252/32.5 |
| 4,216,114 | 8/1980 | Baker | 252/341 |
| 4,234,435 | 11/1980 | Meinhardt et al. | 252/51.5 A |
| 4,445,576 | 5/1984 | Drake et al. | 166/291 |
| 4,708,753 | 11/1987 | Forsberg | 149/2 |
| 4,818,309 | 4/1989 | Yabsley | 149/2 |
| 4,828,633 | 5/1989 | Forsberg | 149/2 |
| 4,844,756 | 7/1989 | Forsberg | 149/2 |
| 4,919,178 | 4/1990 | Riga et al. | 149/2 |
| 4,919,179 | 4/1990 | Chattopadhyay | 149/2 |
| 4,940,497 | 7/1990 | Van Ommeren | 149/2 |
| 4,997,642 | 3/1991 | Curtis et al. | 71/64.08 |
| 5,047,175 | 9/1991 | Forsberg | 252/356 |
| 5,423,897 | 6/1995 | Hudson et al. | 71/64.11 |
| 5,445,663 | 8/1995 | Carlsen et al. | 71/64.08 |
| 5,451,243 | 9/1995 | Ahlnas | 71/64.11 |
| 5,478,375 | 12/1995 | Hudson | 71/64.11 |
| 5,482,529 | 1/1996 | Ahlnas et al. | 71/64.08 |

FOREIGN PATENT DOCUMENTS

| | | | |
|---|---|---|---|
| 2007348 | 7/1991 | Canada | C06B 45/00 |
| 102827A2 | 3/1984 | European Pat. Off. | E21B 33/138 |
| 557568A1 | 9/1993 | European Pat. Off. | C05C 9/00 |
| 561600A2 | 9/1993 | European Pat. Off. | C06B 47/14 |
| WO9316968 | 9/1993 | WIPO | C05G 5/00 |

OTHER PUBLICATIONS

WO93/01150 published Jan. 21 1993 (Ahlnas).

*Primary Examiner*—Wayne Langel
*Attorney, Agent, or Firm*—John H. Engelmann; Frederick D. Hunter, Sr.; David M. Shold

[57] ABSTRACT

A non-explosive water in oil emulsion fertilizer composition comprising: a discontinuous aqueous phase comprising at least one fertilizer component; a continuous oil phase; an emulsifier comprising the reaction product of at least one succinic acylating agent and at least one co-reactant selected from the group consisting of: primary alkanol amines, secondary alkanol amines, tertiary alkanol amines, primary amines, secondary amines, tertiary amines, poly-amines, alcohols, polyols, and phenols is disclosed. The ferilizer compositions provide for delayed release of the fertilizer components.

95 Claims, No Drawings

WATER-IN-OIL EMULSION FERTILIZER COMPOSITIONS

TECHNICAL FIELD OF THE INVENTION

This invention relates to water-in-oil emulsions and more particularly to water-in-oil emulsion fertilizers comprising a continuous oil phase, a discontinuous water phase containing water-soluble fertilizer components, and emulsifiers produced from hydrocarbyl succinic acylating agents.

BACKGROUND OF THE INVENTION

It is an object of the invention to provide fertilizer compositions which release the fertilizer components a controlled rate. More particularly, it is an object of the invention to provide water-in-oil emulsion fertilizer compositions with controlled release properties.

Water-in-oil emulsions have been used for a variety of uses including emulsion explosives. Water-in-oil explosive emulsions typically comprise a continuous organic phase and a discontinuous oxidizer phase containing water and an oxygen-supplying source such as ammonium nitrate, the oxidizer phase being dispersed throughout the continuous organic phase. Examples of such water-in-oil explosive emulsions are disclosed, inter alia, in U.S. Pat. Nos. 5,047,175; and 4,828,633. The emulsifier is a salt derived from high molecular weight carboxylic acylating agent coupled to a low molecular weight carboxylic acylating agent. Succinic acids and anhydrides are the preferred acylating agents.

U.S. Pat. No. 4,919,178 discloses water in oil emulsion explosives in which the emulsifier is the reaction product of two components. The first component is the reaction product certain carboxylic acids or anhydrides, including substituted succinic acids and anhydrides with ammonia or an amine and an alkali metal or an alkaline earth metal. The second component is the salt of a phosphorous containing acid.

European Patent application EP 561,600 A discloses a water-in-oil emulsion explosive in which the emulsifier is the reaction product of a substituted succinic acylating agent, having at least 1.3 succinic groups per equivalent weight of substituents, with ammonia and/or an amine. The substituent is a polyalkene having an number average molecular weight of greater than 500 and preferably 1300–1500.

Canadian Patent 2,007,348 discloses a water-in-oil emulsion explosive composition containing an expanded perlite as a void former. The invention is operative with explosive emulsions formed using a wide variety of emulsifiers including derivatives of polyisobutenyl succinic anhydride.

U.S. Pat. No. 4,940,497 discloses a water-in-oil emulsion explosive composition containing an expanded perlite as a void former. The invention is operative with explosive emulsions formed using a wide variety of emulsifiers including salts of polyisobutenyl succinic anhydride.

U.S. Pat. No. 4,919,179 discloses a water-in-oil emulsion explosive wherein the emulsifier is a particular type of ester of polyisobutenyl succinic anhydride.

U.S. Pat. No. 4,844,756 discloses a water-in-oil emulsion explosive wherein the emulsifier is a salt produced by reacting a hydrocarbyl substituted carboxylic acid or anhydride, including substituted succinic acids and anhydrides, with ammonia, an amine, and/or an alkali or alkaline earth metal.

U.S. Pat. No. 4,818,309 discloses a water-in-oil emulsion explosive wherein the emulsifier is a polyalkenyl succinic acid or derivative thereof. The succinic acid may be used in the form of an anhydride, an ester, an amide or an imide. A condensate with ethanolamine is preferred.

U.S. Pat. No. 4,708,753 discloses a water-in-oil emulsion suitable for use in explosive and functional fluids wherein the emulsifier is a reaction product of a hydrocarbyl substituted carboxylic acid, including a succinic acid, with an amine. The substituent contains 20–500 carbon atoms, and the aqueous phase contains a water soluble, oil insoluble functional additive.

European Patent EP 102,827 A discloses a water-in-oil emulsion composition useful as a well control fluid. The emulsifier is a polyamine derivative, especially an alkylene polyamine derivative, of a polyisobutenyl succinic anhydride or a borated or carboxylated derivative thereof.

U.S. Pat. No. 4,445,576 discloses a water-in-oil emulsion composition useful as a spacer fluid in well drilling. The emulsifier is an amine derivative, especially a polyamine derivative, of a polyalkenyl succinic anhydride.

U.S. Pat. No. 4,216,114 discloses the demulsification of water-in-oil emulsions using a polyester derivative prepared by reacting a 9–18 carbon alkyl or alkenyl substituted succinic anhydride with a polyalkylene glycol, and a polyhydric alcohol containing greater than 3 hydroxyl groups.

U.S. Pat. No. 3,269,946 discloses water-in-oil emulsions useful as lubricants or hydraulic fluids. The emulsifier is a substituted succinamide.

U.S. Pat. No. 3,255,108 discloses water-in-oil emulsions useful as lubricants or hydraulic fluids. The emulsifier is a substituted succinic ester.

United States defensive publication T969,003 discloses water-in-oil emulsion fertilizers. These materials are prepared by dissolving an invert emulsifier in an oil such as kerosene. The amount of surfactant used can vary over a wide range. The desired release rates are obtained when the surfactant makes up between 0.6 and 1% of the fertilizer formulation. A liquid fertilizer (a water solution) is emulsified with the oil to form an invert emulsion containing 80–90% liquid fertilizer, 10–20% oil and 0.6–1% surfactant. Ammonium phosphate, ammonium polyphosphate, ammonium nitrate, potassium chloride, urea solutions and mixtures thereof may be used as liquid fertilizers.

Patent Application WO93/16968 discloses a method of transport and storage of fertilizer compositions. The nutrient component of the fertilizer composition is in the form of the discontinuous water phase of a water-in-oil emulsion. The volume phase ratio of the discontinuous water phase to the total volume is in the range of 0.85–0.95. The nutrient component may include urea, ammonium nitrate or calcium ammonium nitrate. The emulsifier is added to the oil phase prior to stirring together the aqueous phase and the oil phase.

British Patent Application 0557568A1 discloses fertilizer compositions comprising dispersions or solution of nutrient components and the method for its manufacture. The solution/dispersion constitutes the discontinuous phase of a water-in-oil emulsion having a volume phase ratio of the discontinuous phase to the total volume in the range of 0.80–0.95. The oil or hydrocarbon component of the water-in-oil emulsion comprises mineral vegetable or animal oils, wax or a mixture of these, and the emulsion comprises at least one water-in-oil emulsifier. The oil phase may include an elastomer. The emulsifier disclosed in the examples is sorbitan monooleate (Span 80 from ICI).

SUMMARY OF THE INVENTION

A non-explosive water in oil emulsion fertilizer composition comprising: a discontinuous aqueous phase comprising at least one fertilizer component; a continuous oil phase; an emulsifier comprising the reaction product of at least one succinic acylating agent and at least one co-reactant selected from the group consisting of: primary alkanol amines, secondary alkanol amines, tertiary alkanol amines, primary amines, secondary amines, tertiary amines, poly-amines, alcohols, polyols, and phenols is disclosed.

DETAILED DESCRIPTION OF THE INVENTION

The fertilizer compositions of the present invention are designed to provide controlled release of the fertilizer components. The compositions are intended for lawn, garden, and agricultural use. It has been found that the emulsifiers of the present invention provide emulsions with much slower release rates than those obtained using emulsifiers disclosed in the prior art.

When standard non-delayed release fertilizer compositions are applied in the ordinary manner, the nutrients they contain are released very quickly. If the nutrients are not absorbed immediately, either by the soil or by the growing plants, they may run off the land into the ground water. This run off is a problem because the plants which were to be fertilized can no longer obtain the components which have run off, and the run off can cause pollution of the ground water. Fertilizers which release their nutrient components over a period of time, and thereby provide for better utilization of the fertilizer applied, as well as reduced pollution of ground water are desirable. Generally speaking, the more oil and emulsifier in an emulsion fertilizer composition, the slower the release of fertilizer components which is observed. However, oil and emulsifiers are not fertilizer components in that they do not provide nutrition to plants. In addition, oil may itself be environmentally undesirable. Accordingly, it is desired to obtain sustained release with as low levels of oil and emulsifier as possible.

Surprisingly, it has been found that the emulsifiers of the present invention provide emulsions with much slower release rates than those obtained using emulsifiers disclosed in the prior art. The oil and emulsifier are present at low levels.

The present invention provides for emulsion fertilizer based upon emulsifiers which are derived from hydrocarbyl substituted succinic acylating agents. The hydrocarbyl substituted succinic acylating agents may be represented by the following formulae:

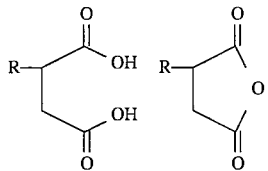

wherein R is a hydrocarbyl group.

In general, the derivatives of the succinic acylating agents which are useful as emulsifiers in the present invention are prepared by reacting the succinic acylating agent with co-reactants capable of reacting with a carboxyl or an anhydride group such as ammonia, amines, alcohols, alkanol amines, and phenols. As those skilled in the art will readily appreciate, the wide variety of amines, alkanol amines, phenols and alcohols available, leads to are great variety of possible emulsifiers useful in the present invention. In addition, as will be set forth below, the initial products may be treated with other reagents to form derivatives.

Amine co-reactants include aliphatic amines, aromatic amines, heterocyclic amines, monoamines, diamines polyamines, primary, secondary, and tertiary amines. The classes of amines are not exclusive. For example a polyamine may include both primary, secondary or tertiary nitrogens. There are three basic types of reactions which a succinic acylating agent can undergo with an amine. The first reaction is simple salt formation. In this reaction, the amine acts as a base and accepts a proton from the carboxylic acid. All ordinary amines can undergo this reaction. A typical equation for the formation of a salt from an amine and a substituted succinic acid:

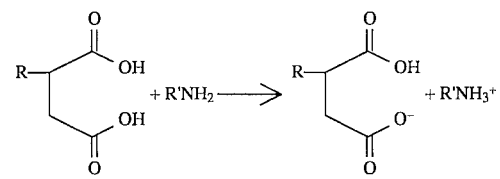

A second typical reaction which an amine can undergo with a succinic acylating agent is the formation of an amide. In this reaction the amine condenses with a single carboxyl group eliminating a molecule of water. Only primary and secondary amines can undergo amide formation. A typical equation for the formation of an amide from an amine and a substituted succinic acid is:

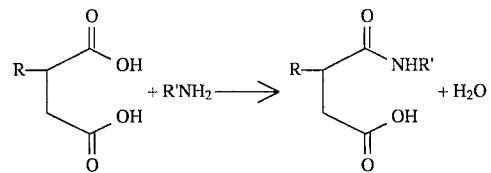

A typical equation for the formation of an amide from an amine and a substituted succinic anhydride is:

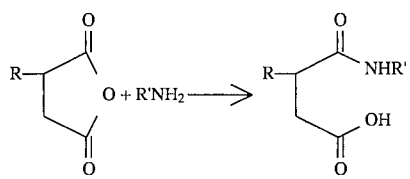

The third reaction of amines with succinic acylating agents is imide formation. In this reaction an amine condenses with two carboxyl groups with the elimination of two molecules of water. Only primary amines can undergo imide formation. Imides can be produced from either the succinic acid or the anhydride. However, when the anhydride is used, only one molecule of water is eliminated. A typical equation for the formation of an imide from an amine and a substituted succinic anhydride is:

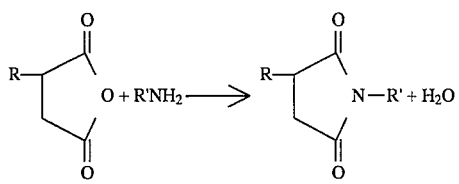

A typical equation for the formation of an imide from an amine and a substituted succinic acid is:

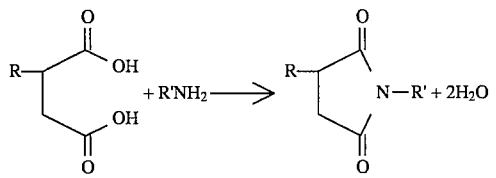

Salts form under relatively mild conditions, while the formation of amides and imides generally requires higher temperatures and longer reaction times.

The class of alcohol co-reactants includes aliphatic alcohols and aromatic alcohols (phenols). The class includes monoalcohols, glycols (dialcohols) and polyalcohols. The alcohols include compounds which are formed by reacting a conventional alcohol with an epoxide to form an alcohol containing ether linkages. The basic reaction between an alcohol and a succinic acylating agent is ester formation. A typical equation for ester formation from an alcohol and a substituted succinic acid is:

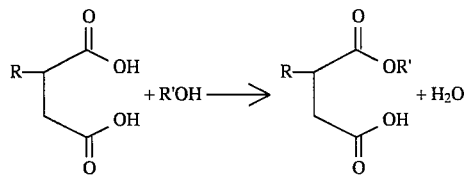

A typical equation for the formation of an ester from an alcohol and a substituted succinic anhydride is:

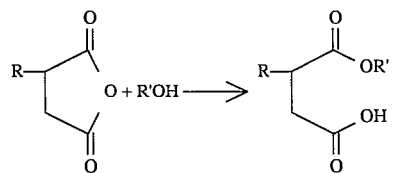

Amino alcohols may also be reacted with succinic acylating agents to form emulsifiers of the present invention. The amino alcohols contain both an amino group and an alcohol group. Amino alcohols are able to undergo the reactions of both amines and alcohols.

The term "emulsion" as used in this specification and in the appended claims is intended to cover not only water-in-oil emulsions, but also compositions derived from such emulsions wherein at temperatures below that at which the emulsion is formed the discontinuous phase is solid or in the form of droplets of super-cooled liquid. This term also covers compositions derived from or formulated as such water-in-oil emulsions that are in the form of gelatinous or semi-gelatinous compositions.

The term "hydrocarbyl" is used herein to include:

(1) hydrocarbyl groups, that is, aliphatic (e.g., alkyl or alkenyl), alicyclic (e.g., cycloalkyl, cycloalkenyl), aromatic, aliphatic- and alicyclic-substituted aromatic groups and the like as well as cyclic groups wherein the ring is completed through another portion of the molecule (that is, any two indicated groups may together form an alicyclic group);

(2) substituted hydrocarbyl groups, that is, those groups containing nonhydrocarbon groups which, in the context of this invention, do not alter the predominantly hydrocarbyl nature of the hydrocarbyl group; those skilled in the art will be aware of such groups, examples of which include ether, oxo, halo (e.g., chloro and fluoro), alkoxyl, mercapto, alkylmercapto, nitro, nitroso, sulfoxy, etc.;

(3) hetero groups, that is, groups which, while having predominantly hydrocarbyl character within the context of this invention, contain other than carbon in a ring or chain otherwise composed of carbon atoms. Suitable heteroatoms will be apparent to those of skill in the art and include, for example, sulfur, oxygen, nitrogen and such substituents as pyridyl, furanyl, thiophenyl, imidazolyl, etc.

In general, no more than about three nonhydrocarbon groups or heteroatoms and preferably no more than one, will be present for each ten carbon atoms in a hydrocarbyl group. Typically, there will be no such groups or heteroatoms in a hydrocarbyl group and it will, therefore, be purely hydrocarbon.

The hydrocarbyl groups are preferably free from acetylenic unsaturation. Ethylenic unsaturation, when present will generally be such that there is no more than one ethylenic linkage present for every ten carbon-to-carbon bonds. The hydrocarbyl groups are often completely saturated and therefore contain no ethylenic unsaturation.

The term "lower" as used herein in conjunction with terms such as alkyl, alkenyl, alkoxy, and the like, is intended to describe such groups which contain a total of up to 7 carbon atoms.

I. SUCCINIC ACYLATING AGENTS:

The succinic acylating agent is one or more acids or acid-producing compounds. Throughout this specification and in the appended claims, the term "succinic acylating agent" is intended to include carboxylic acids as well as acid-producing derivatives thereof such as anhydrides, esters, acyl halides and mixtures thereof, unless otherwise specifically stated.

The succinic acylating agents include hydrocarbyl-substituted succinic acids and anhydrides which may be represented by the formulae:

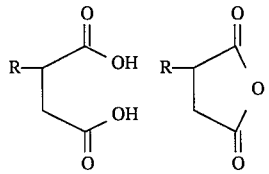

wherein R is a $C_{10}$ to about a $C_{500}$ hydrocarbyl group. As will be set forth more fully below, when two succinic acylating agents are combined in a coupled molecule the R group may be a $C_2$ to about a $C_{500}$ hydrocarbyl group. Preferably, R is an aliphatic or alicyclic hydrocarbyl group with less than about 10% of its carbon-to-carbon bonds being unsaturated. As set forth more fully below, R may derived from olefin polymers. R may also be derived from non-polymerized olefins of from 10 to about 18 carbon atoms with alpha-olefins being particularly useful. For bridged species olefins containing 2 to 18 carbons may be used. Examples of such olefins include ethylene, propene, 1-butene, 1-pentene, 1-hexene, 1-heptene, 1-octene, 1-nonene, 1-decene, 1-undecene, 1-dodecene, 1-tridecene, 1-tetradecene, 1-penta-decene, 1-hexadecene, 1-heptadecene, 1-octadecene, etc. Commercially available alpha olefin fractions such as $C_{15-18}$ alpha-olefins, $C_{12-16}$ alpha-olefins, $C_{14-16}$ alpha-olefins, $C_{14-18}$ alpha-olefins, $C_{16-18}$ alpha-olefins, etc., are particularly useful; these commercial alpha-olefin fractions also usually include minor amounts of alpha-olefins outside the given ranges. The R group may also be derived from olefinic compounds containing up to about 500 carbon atoms. Preferably the R group contains about 60 carbon atoms to about 140 carbon atoms, and may contain polar substituents, oil-solubilizing pendant groups, and be unsaturated within the general limitations explained hereinabove. The production of hydrocarbyl substituted succinic derivatives is well known to those of skill in the art and need not be discussed in detail herein. Generally, these processes involve the reaction of (1) an ethylenically unsaturated carboxylic acid, acid halide, anhydride or ester reactant, such as maleic anhydride, with (2) an ethylenically unsaturated hydrocarbon (a chlorine free process) or a chlorinated hydrocarbon (a chlorine process) at a temperature within the range of about 100°–300° C., preferably, about 100° C. to about 200° C. The product from this reaction is a hydrocarbyl-substituted succinic anhydride wherein the substituent is derived from the olefin or chlorinated hydrocarbon. The present invention works equally well with the products produced by a chlorine process or a chlorine free process. If desired, the reaction product of the halide or olefin with the unsaturated acid may be hydrogenated to remove all or a portion of any ethylenically unsaturated covalent linkages by standard hydrogenation procedures.

The ethylenically unsaturated hydrocarbon reactant, used in a chlorine free process, may be derived from olefin streams. The chlorinated hydrocarbon reactant used in a chlorine process, may be derived from substantially saturated petroleum fractions or substantially saturated olefin polymers. Polymers and chlorinated polymers derived from mono-olefins having from 2 to about 30 carbon atoms are preferred. Especially useful polymers are the polymers of 1-mono-olefins such as ethylene, propene, 1-butene, isobutene, 1-hexene, 1-octene, 2-methyl-1-heptene, 3-cyclohexyl-1-butene, and 2-methyl-5-propyl-1-hexene. Polymers of medial olefins, i.e., olefins in which the olefinic linkage is not at the terminal position, likewise are useful. These are exemplified by 2-butene, 3-pentene, and 4-octene.

Interpolymers of 1-mono-olefins such as illustrated above with each other and with other interpolymerizable olefinic substances such as aromatic olefins, cyclic olefins, and polyolefins, are also useful sources of the ethylenically unsaturated reactant. Such interpolymers include for example, those prepared by polymerizing isobutene with styrene, isobutene with butadiene, propene with isoprene, propene with isobutene, ethylene with piperylene, isobutene with chloroprene, isobutene with p-methyl-styrene, 1-hexene with 1,3-hexadiene, 1-octene with 1-hexene, 1-heptene with 1-pentene, 3-methyl-1-butene with 1-octene, 3,3-dimethyl-1-pentene with 1-hexene, isobutene with styrene and piperylene, etc.

For reasons of hydrocarbon solubility, the Interpolymers contemplated for use in preparing the acylating agents of this invention are preferably substantially aliphatic and substantially saturated, that is, they should contain at least about 80% and preferably about 95%, on a weight basis, of units derived from aliphatic monoolefins. Preferably, they will contain no more than about 5% olefinic linkages based on the total number of the carbon-to-carbon covalent linkages present.

In one embodiment of the invention, the polymers and chlorinated polymers are obtained by the polymerization of a $C_4$ refinery stream having a butene content of about 35% to about 75% by weight and an isobutene content of about 30% to about 60% by weight in the presence of a Lewis acid catalyst such as aluminum chloride or boron trifluoride. These polyisobutenes preferably contain predominantly (that is, greater than about 80% of the total repeat units) isobutene repeat units of the formula:

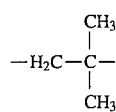

The polymeric materials which may be used to prepare the succinic acylating agents may be characterized, as above, by the average number of carbon atoms which they contain. Polymeric materials are not uniform, and contain a variety of molecules of different chain lengths. Such polymers have also been characterized by their Mn (number average molecular weight). The average number of carbons correlates with the Mn of the polymer. For example, if a polymer containing an average of 100 carbon atoms is reacted with maleic anhydride, the substituted succinic anhydride produced has an Mn of approximately 1500. Similarly, for a polymer containing an average of 500 carbon atoms, the substituted succinic anhydride produced would have an Mn of approximately 7100. Such polymers have also been characterized by their Mw (weight average molecular weight). Because the chain lengths of a polymeric material are not always evenly distributed, the Mw and Mn are not always identical. The polymeric materials useful in preparing the hydrocarbyl substituted succinic acylating agents have Mw/Mn ratios from about 1.5 to about 4.5. Materials with ratios of about 1.5 to about 3.6 or 3.2 are useful. Materials with ratios of about 1.8, or about 2, to about 2.5, about 3.2, or about 3.6 are useful. Gel permeation chromatography may be used to determine the values of Mw and Mn as well as the Mw/Mn ratio. A useful method is disclosed in U.S. Pat. No. 4,234,435.

If an excess of maleic anhydride is reacted with the polymeric material to form the substituted succinic acylating agent, more than one succinic group may add to an individual polymer chain. The amount of such poly-substitution may be expressed in terms of the number of succinic groups for each equivalent weight of substituent group (derived from the polymeric material).

The equivalent weight of the polyalkene is its Mn. The equivalents of substituent groups in the succinic acylating agent is determined by dividing the total weight of substituents by the Mn of the polyalkene. The number of succinic groups per equivalent weight of substituents present in the succinic acylating agent may be found by comparing the equivalents of succinic groups in the molecule to the equivalents of substituents. This subject is disclosed in U.S. Pat. No. 4,234,435 which is hereby incorporated by reference for its disclosure of methods determining the number of succinic groups per equivalent of substituents and for its disclosure of methods of measuring the values of Mw and Mn.

The substituted succinic acylating agents useful in the present invention have from about 1.0 to about 4.5 succinic groups for each equivalent weight of substituent group. The preferred number of succinic groups for each equivalent weight of substituent group is from about 1.0 to about 2.5 and the more preferred range is from about 1.0 to 2.0.

If acids are the desired starting material, the hydrocarbyl substituted succinic anhydrides may be hydrolyzed by treatment with water or steam to the corresponding acid. Acid halides of the hydrocarbyl-substituted succinic acids may be used as the acylating agents of this invention. They may be prepared by the reaction of such acids or their anhydrides with halogenating agents such as phosphorus tribromide, phosphorus pentachloride, phosphorus oxychloride or thionyl chloride.

II CO-REACTANTS

The emulsifiers used in preparing the fertilizer compositions are prepared by reacting the succinic acylating agent with co-reactants capable of reacting with a carboxyl or an anhydride group such as ammonia, amines, alcohols, alkanol amines, and phenols.

AMINES:

The term "amine" as used herein includes all the types of amines described below including alkanol amines.

Monoamines:

The mono-amines useful in making the emulsifiers include primary amines, secondary amines and tertiary mono-amines. Mixtures of two or more amines may be used.

The amines may be aliphatic, cycloaliphatic, aromatic or heterocyclic, including aliphatic-substituted aromatic, aliphatic-substituted cycloaliphatic, aliphatic-substituted heterocyclic, cycloaliphatic-substituted aliphatic, cycloaliphatic-substituted aromatic, cycloaliphatic-substituted heterocyclic, aromatic-substituted aliphatic, aromatic-substituted cycloaliphatic, aromatic-substituted heterocyclic, heterocyclic-substituted aliphatic, heterocyclic-substituted cycloaliphatic and heterocyclic-substituted aromatic amines. These amines may be saturated or unsaturated. If unsaturated, the amine is preferably free from acetylenic unsaturation. The amines may also contain non-hydrocarbon substituents or groups as long as these groups do not significantly interfere with the reaction of the amines with the acylating agents (A). Such non-hydrocarbon substituents or groups include lower alkoxy, lower alkyl, mercapto, nitro, and interrupting groups such as —O— and —S— (e.g., as in such groups as —CH$_2$CH$_2$—X—CH$_2$CH$_2$— where X is —O— or —S—).

With the exception of the high molecular weight hydrocarbyl-substituted amines described more fully hereinafter, the amines used in this invention ordinarily contain less than about 40 carbon atoms in total and usually not more than about 20 carbon atoms in total. Specific examples of monoamines include ethylamine, di-ethylamine, tri-ethylamine, n-butylamine, di-n-butylamine, allylamine, isobutylamine, cocoamine, stearylamine, laurylamine, methyllaurylamine, oleylamine, N-methyloctylamine, dodecylamine, octadecylamine, and the like.

Cycloaliphatic monoamines are those monoamines wherein there is one cycloaliphatic substituent attached directly to the amino nitrogen through a carbon atom in the cyclic ring structure. Examples of cycloaliphatic monoamines include cyclohexylamines, cyclopentylamines, cyclohexenylamines, cyclopentenylamines, N-ethyl-cyclohexylamines, dicyclohexylamines, and the like.

Suitable aromatic amines include those monoamines wherein a carbon atom of the aromatic ring structure is attached directly to the amino nitrogen. The aromatic ring will usually be a mononuclear aromatic ring (i.e., one derived from benzene) but may include fused aromatic rings, especially those derived from naphthylene. Examples of aromatic monoamines include aniline, di(para-methylphenyl) amine, naphthylamine, N-(n-butyl) aniline, and the like. The aromatic amine may have aliphatic, cycloaliphatic, and heterocyclic substituents.

Heterocyclic mono-amines may also be used. As used herein, the terminology "heterocyclic mono-amine(s)" is intended to describe those heterocyclic amines containing at least one primary, secondary or tertiary amino group and at least one nitrogen as a heteroatom in the heterocyclic ring. Heterocyclic amines may be saturated or unsaturated and may contain various substituents such as nitro, alkoxy, alkyl mercapto, alkyl, alkenyl, aryl, alkaryl, or aralkyl substituents. Generally, the total number of carbon atoms in the substituents will not exceed about 20. Heterocyclic amines may contain heteroatoms other than nitrogen, especially oxygen and sulfur. The 5- and 6-membered heterocyclic rings are preferred.

Among the suitable heterocyclics are tetra- and di-hydro pyridines, pyrroles, piperidines, morpholines, thiomorpholines, N-aminoalkyl-morpholines, and N-aminoalkylthiomorpholines and mixtures of two or more of these heterocyclic amines. Preferred heterocyclic amines are the saturated 5- and 6-membered heterocyclic amines containing only nitrogen, oxygen and/or sulfur in the hetero ring, especially the piperidines, thiomorpholines, morpholines, pyrrolidines, and the like.

The tertiary monoamines may be represented by the formula

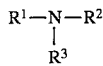

wherein $R^1$, $R^2$ and $R^3$ are the same or different hydrocarbyl groups. Preferably, $R^1$, $R^2$ and $R^3$ are independently hydrocarbyl groups of from 1 to about 20 carbon atoms. Examples of useful tertiary amines include trimethyl amine, triethyl amine, tripropyl amine, tributyl amine, monomethyldiethyl amine, monoethyldimethyl amine, dimethylpropyl amine, dimethylbutyl amine, dimethylpentyl amine, dimethylhexyl amine, dimethylheptyl amine, dimethyloctyl amine, dimethylnonyl amine, dimethyldecyl amine, dimethyldicodanyl amine, dimethylphenyl amine, N,N-dioctyl-1-octanamine, N,N-didodecyl-1-dodecanamine tricocoamine, trihydrogenated-tallow amine, N-methyl-dihydrogenated tallow amine, N,N-dimethyl-1-dodecanamine, N,N-dimethyl-1-tetradecanamine, N,N-dimethyl-1-hexadecanamine, N,N-dimethyl-1-octadecanamine, N,N-dimethylcoco, amine, N,N-dimethyl soyaamine, N,N-dimethyl hydrogenated tallow amine, etc.

Polyamines:

The polyamines useful in forming the emulsifiers of the present invention may be aliphatic, cycloaliphatic, aromatic or heterocyclic, including aliphatic-substituted aromatic, aliphatic-substituted cycloaliphatic, aliphatic-substituted heterocyclic, cycloaliphatic-substituted aliphatic, cycloaliphatic-substituted aromatic, cycloaliphatic-substituted heterocyclic, aromatic substituted aliphatic, aromatic-substituted cycloaliphatic, aromatic-substituted heterocyclic, heterocyclic-substituted aliphatic, heterocyclic-substituted cycloaliphatic and heterocyclic-substituted aromatic amines. These amines may be saturated or unsaturated. If unsaturated, the amine is preferably free from acetylenic unsaturation. These amines may also contain non-hydrocarbon substituents or groups as long as these groups do not significantly interfere with the reaction of such amines with acylating agents. Such non-hydrocarbon substituents or groups include lower alkoxy, lower alkyl, mercapto, nitro, and interrupting groups such as —O— and —S— (e.g., as in such groups as

—CH$_2$CH$_2$—X—CH$_2$CH$_2$— where X is —O— or —S—).

The polyamines include aliphatic, cycloaliphatic and aromatic polyamines analogous to the aliphatic, cycloaliphatic and aromatic monoamines described below except for the presence within their structure of at least one additional >NH or —NH$_2$ group.

Hydrazine and substituted-hydrazines may also be used. The substituents which may be present on the hydrazine include alkyl, alkenyl, aryl, aralkyl, alkaryl, and the like. Usually, the substituents are alkyl, especially lower alkyl, phenyl, and substituted phenyl such as lower alkoxy-substituted phenyl or lower alkyl-substituted phenyl. Specific examples of substituted hydrazines are methylhydrazine, N,N-dimethylhydrazine, phenylhydrazine, and the like.

Another group of amines suitable for use in this invention are branched polyalkylene polyamines. The branched polyalkylene polyamines are polyalkylene polyamines wherein the branched group is a side chain containing on the average at least one nitrogen-bonded aminoalkylene

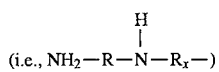

group per nine amino units present on the main chain; for example, 1–4 of such branched chains per nine units on the main chain, but preferably one side chain unit per nine main chain units. Thus, these polyamines contain at least three primary amino groups and at least one tertiary amino group. These amines may be expressed by the formula:

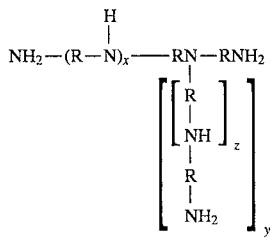

wherein R is an alkylene group such as ethylene, propylene, butylene and other homologs (both straight chained and branched), etc., but preferably ethylene; and x, y and z are integers; x is in the range of from about 4 to about 24 or more, preferably from about 6 to about 18; y is in the range of from 1 to about 6 or more, preferably from 1 to about 3; and z is in the range of from zero to about 6, preferably from zero to about 1. The x and y units may be sequential, alternative, orderly or randomly distributed. A useful class of such polyamines includes those of the formula:

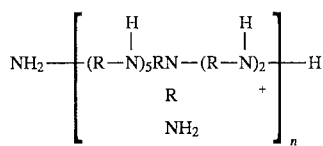

wherein n is an integer in the range of from 1 to about 20 or more, preferably in the range of from 1 to about 3, and R is preferably ethylene, but may be propylene, butylene, etc. (straight chained or branched). Useful embodiments are represented by the formula:

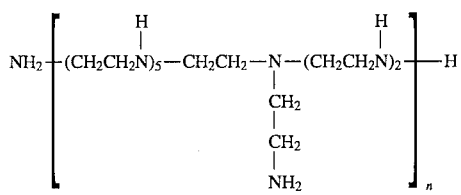

wherein n is an integer in the range of 1 to about 3. The groups within the brackets may be joined in a head-to-head or a head-to-tail fashion. U.S. Pat. Nos. 3,200,106 and 3,259,578 are incorporated herein by reference for their disclosures relative to said polyamines.

Suitable polyamines also include polyoxyalkylene polyamines, e.g., polyoxyalkylene diamines and polyoxyalkylene triamines, having average molecular weights ranging from about 200 to about 4000, preferably from about 400 to 2000. Examples of these polyoxyalkylene polyamines include those amines represented by the formula:

NH$_2$-Alkylene-(—O-Alkylene-)$_m$NH$_2$ wherein m has a value of from about 3 to about 70, preferably from about 10 to about 35.

R-[Alkylene-(—O-Alkylene-)$_n$NH$_2$]$_{3-6}$ wherein n is a number in the range of from 1 to about 40, with the proviso that the sum of all of the n's is from about 3 to about 70 and generally from about 6 to about 35, and R is a polyvalent saturated hydrocarbyl group of up to about 10 carbon atoms having a valence of from about 3 to about 6. The alkylene groups may be straight or branched chains and contain from 1 to about 7 carbon atoms, and usually from 1 to about 4 carbon atoms. The various alkylene groups present within the above formulae may be the same or different.

More specific examples of these polyamines include:

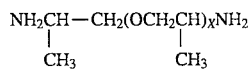

wherein x has a value of from about 3 to about 70, preferably from about 10 to 35; and

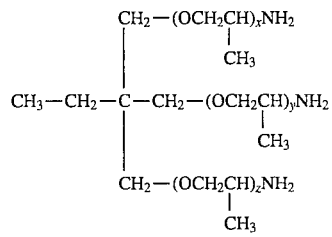

wherein x+y+z have a total value ranging from about 3 to about 30, preferably from about 5 to about 10.

Useful polyoxyalkylene polyamines include the polyoxyethylene and polyoxypropylene diamines and the polyoxypropylene triamines having average molecular weights ranging from about 200 to about 2000. The polyoxyalkylene polyamines are commercially available from the Huntsman Corp. under the trade name "Jeffamine". U.S. Pat. Nos. 3,804,763 and 3,948,800 are incorporated herein by reference for their disclosure of such polyoxyalkylene polyamines.

Useful polyamines are the alkylene polyamines, including the polyalkylene polyamines, as described in more detail hereafter. The alkylene polyamines include those conforming to the formula:

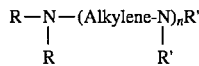

wherein n is from 1 to about 10, preferably from 1 to about 7; each R and R' is independently a hydrogen atom, a hydrocarbyl group or a hydroxy-substituted hydrocarbyl group having up to about 700 carbon atoms, preferably up to about 100 carbon atoms, more preferably up to about 50 carbon atoms, more preferably up to about 30 carbon atoms, with the proviso that at least one of R and at least one of R' are hydrogen; and the "Alkylene" group has from about 1 to about 18 carbon atoms, preferably from 1 to about 4 carbon atoms, with the preferred Alkylene being ethylene or propylene. Useful alkylene polyamines are those wherein each R and each R' is hydrogen with the ethylene polyamines, and mixtures of ethylene polyamines being particularly preferred. Such alkylene polyamines include methylene polyamines, ethylene polyamines, butylene polyamines, propylene polyamines, pentylene polyamines, hexylene polyamines, heptylene polyamines, etc. The higher homologs of such amines and related aminoalkyl-substituted piperazines are also included.

Alkylene polyamines that are useful include ethylene diamine, diethylene triamine, triethylene tetramine, tetraethylene pentamine, pentaethylene hexamine, propylene diamine, trimethylene diamine, hexamethylene diamine, decamethylene diamine, octamethylene diamine, di(heptamethylene)triamine, tripropylene tetramine, tetraethylene pentamine, trimethylene diamine, pentaethylene hexamine, di(trimethylene)triamine, N-(2-aminoethyl)piperazine, 1,4-bis(2-aminoethyl)piperazine, and the like. Higher homologs as are obtained by condensing two or more of the above-illustrated alkylene amines are useful as amines in this invention as are mixtures of two or more of any of the afore-described polyamines.

Ethylene polyamines, such as those mentioned above, are described in detail under the heading "Diamines and Higher Amines, Aliphatic" in The Encyclopedia of Chemical Technology, Third Edition, Kirk-Othmer, Volume 7, pp. 580–602, a Wiley-Interscience Publication, John Wiley and Sons, 1979, these pages being incorporated herein by reference. Such compounds are prepared most conveniently by the reaction of an alkylene chloride with ammonia or by reaction of an ethylene imine with a ring-opening reagent such as ammonia, etc. These reactions result in the production of the somewhat complex mixtures of alkylene polyamines, including cyclic condensation products such as piperazines.

Alkoxylated alkylene polyamines (e.g., N,N-1(diethanol)-ethylene diamine) may be used. Such polyamines may be made by reacting alkylene amines (e.g., ethylenediamine) with one or more alkylene oxides (e.g., ethylene oxide, octadecene oxide) of two to about 20 carbons. Similar alkylene oxide-alkanol amine reaction products may also be used such as the products made by reacting primary, secondary or tertiary alkanol amines with ethylene, propylene or higher epoxides in a 1:1 or 1:2 molar ratio. Reactant ratios and temperatures for carrying out such reactions are known to those skilled in the art.

Specific examples of alkoxylated alkylene polyamines include N-(2-hydroxyethyl)ethylene diamine, N,N-bis(2-hydroxyethyl)-ethylene-diamine, 1-(2-hydroxyethyl)piperazine, mono(hydroxypropyl)-substituted diethylene triamine, di(hydroxypropyl)-substituted tetraethylene pentamine, N-(3-hydroxybutyl)-tetramethylene diamine, etc. Higher homologs obtained by condensation of the above-illustrated hydroxy alkylene polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid polyamines are also useful.

Alkanol amines:

The hydroxyamines may be primary, secondary or tertiary. The terms "hydroxyamine" "alkanol amine," and "aminoalcohol" describe the same class of compounds and, therefore, may be used interchangeably.

The hydroxyamines may be primary, secondary or tertiary alkanol amines or mixtures thereof. Such amines may be represented, respectfully, by the formulae:

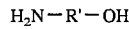

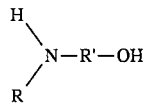

and

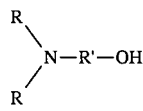

wherein each R is independently a hydrocarbyl group of one to about eight carbon atoms or hydroxyl-substituted hydrocarbyl group of two to about eight carbon atoms and R' is a divalent hydrocarbyl group of about two to about 18 carbon atoms. The group —R'—OH in such formulae represents the hydroxyl-substituted hydrocarbyl group. R' may be an acyclic, alicyclic or aromatic group. Typically, R' is an acyclic straight or branched alkylene group such as an ethylene, 1,2-propylene, 1,2-butylene, 1,2-octadecylene, etc. group. Where two R groups are present in the same molecule they may be joined by a direct carbon-to-carbon bond or through a heteroatom (e.g., oxygen, nitrogen or sulfur) to form a 5-, 6-, 7- or 8-membered ring structure. Typically, however, each R is a lower alkyl group of up to seven carbon atoms.

Examples of useful N-(hydroxyl-substituted hydrocarbyl) amines include ethanolamine di-ethanolamine, ethylethanolamine, dimethylethanolamine, diethylethanolamine, di-(3-hydroxylpropyl)amine, N-(3-hydroxylbutyl)amine, N-(4-hydroxylbutyl)amine, N,N-di-(2-hydroxylpropyl)amine, N-(2-hydroxylethyl)morpholine, its thio analog, N-(2-hydroxyl ethyl)cyclohexyl amine, N-3-hydroxyl cyclopentyl amine, N-(hydroxyl ethyl)piperazine, and the like.

The tertiary alkanol amines are reacted under condensing conditions such that any salts which are formed between the carboxyl groups and the tertiary amine portion of the alkanol amine molecule are converted to condensed products such as esters. In a typical reaction, the anhydride ring is opened by the alcohol to form an ester. The remaining carboxyl group reacts with a second molecule of the alkanol amine to form an second ester.

Further hydroxyamines are the hydroxy-substituted primary amines described in U.S. Pat. No. 3,576,743 by the general formula

wherein $R_a$ is a monovalent organic group containing at least one alcoholic hydroxy group. The total number of carbon atoms in $R_a$ preferably does not exceed about 20. Hydroxy-substituted aliphatic primary amines containing a total of up to about 10 carbon atoms are useful. The polyhydroxy-substituted alkanol primary amines wherein there is only one amino group present (i.e., a primary amino group) having one alkyl substituent containing up to about 10 carbon atoms and up to about 6 hydroxyl groups are useful. These alkanol primary amines correspond to $R_a$—$NH_2$ wherein $R_a$ is a mono- or polyhydroxy-substituted alkyl group. Specific examples of the hydroxy-substituted primary amines include 2-amino-1-butanol, 2-amino-2-methyl-1-propanol, p-(beta-hydroxyethyl)-aniline, 2-amino-1-propanol, 3-amino-1-propanol, 2-amino-methyl-1,3-propanediol, 2-amino-2-ethyl-1, 3-propanediol, N-(beta-hydroxypropyl)-N' -(beta-aminoethyl)-piperazine, tris-(hydroxymethyl)amino methane (also known as trismethylolamino methane), 2-amino-1-butanol, ethanolamine, beta-(beta-hydroxyethoxy)-ethyl amine, glucamine, 4-amino-3-hydroxy-3-methyl-1-butene (which may be prepared according to procedures known in the art by reacting isopreneoxide with ammonia), N-3-(aminopropyl)-4-(2-hydroxyethyl)piperadine, 2-amino-6-methyl-6-heptanol, 5-amino-1-pentanol, N-(betahydroxyethyl)1,3-diamino propane, 1,3-diamino-2-hydroxypropane, N-(beta-hydroxy ethoxyethyl)ethylenediamine, trismethylolaminomethane and the like. U.S. Pat. No. 3,576,743 is incorporated herein by reference.

Hydroxyalkyl alkylene polyamines having one or more hydroxyalkyl substituents on the nitrogen atoms, are also useful. Useful hydroxyalkyl-substituted alkylene polyamines include those in which the hydroxyalkyl group is a lower hydroxyalkyl group, i.e., having less than eight carbon atoms. Examples of such hydroxyalkyl-substituted polyamines include N-(2-hydroxyethyl)ethylene diamine, N,N-bis(2-hydroxyethyl)ethylene diamine, 1-(2-hydroxyethyl)-piperazine, monohydroxypropyl-substituted diethylene triamine, dihydroxypropyl-substituted tetraethylene pentamine, N-(3-hydroxybutyl)tetramethylene diamine, etc. Higher homologs as are obtained by condensation of the above-illustrated hydroxy alkylene polyamines through amino groups or through hydroxy groups are likewise useful. Condensation through amino groups results in a higher amine accompanied by removal of ammonia and condensation through the hydroxy groups results in products containing ether linkages accompanied by removal of water.

The hydroxyamines may also be ether N-(hydroxy-substituted hydrocarbyl)amines. These are hydroxyl-substituted poly(hydrocarbyloxy) analogs of the above-described hydroxy amines (these analogs also include hydroxyl-substituted oxyalkylene analogs). Such N-(hydroxyl-substituted hydrocarbyl)amines may be conveniently prepared by reaction of epoxides with afore-described amines and may be represented by the formulae:

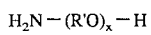

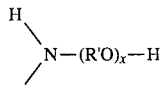

and

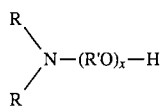

wherein x is a number of about 2 to about 15, each R is independently a hydrocarbyl group of one to about eight carbon atoms or hydroxyl-substituted hydrocarbyl group of two to about eight carbon atoms and R' is a divalent hydrocarbyl group of about two to about 18 carbon atoms.

Polyamine analogs of these hydroxy amines, particularly alkoxylated alkylene polyamines (e.g., N,N-(diethanol)-ethylene diamine) may also be used. Such polyamines may be made by reacting alkylene amines (e.g., ethylenediamine) with one or more alkylene oxides (e.g., ethylene oxide, octadecene oxide) of two to about 20 carbons. Similar alkylene oxide-alkanol amine reaction products may also be used such as the products made by reacting the afore-described primary or secondary alkanol amines with ethylene, propylene or higher epoxides in a 1:1 or 1:2 molar ratio. Reactant ratios and temperatures for carrying out such reactions are known to those skilled in the art.

Specific examples of alkoxylated alkylene polyamines include N-(2-hydroxyethyl)ethylene diamine, N,N-bis(2-hydroxyethyl)ethylene diamine, 1-(2-hydroxyethyl)piperazine, mono(hydroxypropyl)-substituted diethylene triamine, di(hydroxypropyl)-substituted tetraethylene pentamine, N-(3-hydroxybutyl)-tetramethylene diamine, etc. Higher homologs obtained by condensation of the above-illustrated hydroxy alkylene polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid mono- or polyamines are also useful.

ALCOHOLS

The alcohols which may be used in forming succinic derivative emulsifiers include mono-alcohols and poly-alcohols. Mono-alcohols may react with only one carboxyl group on a succinic acylating agent. On the other hand, polyalcohols have one or more potentially reactive hydroxide groups left after the reaction of one hydroxide with a succinic acylating agent.

Mono-alcohols

The mono alcohols which may be reacted with the hydrocarbyl substituted succinic acylating agents include phenols, and primary, secondary, and tertiary aliphatic alcohols. An alcohol is considered to be aliphatic if the hydroxyl group is attached to an aliphatic carbon even if there may be aromatic, heterocyclic, or other functionalities elsewhere in the molecule. The alcohols include compounds of the general formula:

wherein R is a monovalent or organic group joined to the —OH group through a carbon-to-oxygen bond (that is, —COH wherein the carbon is not part of a carbonyl group). The R group may contain 2, to about 40 carbon atoms. In some embodiments lower alcohols such as 2, 3, or 4 carbon alcohols, or 2 to 6 carbon alcohols. In other embodiments alcohols up to 24 or up to 30 carbon atoms are used. These alcohols may be aliphatic, cycloaliphatic, aromatic, and heterocyclic, including aliphatic-substituted cycloaliphatic alcohols, aliphatic-substituted aromatic alcohols, aliphatic-substituted heterocyclic alcohols, cycloaliphatic-substituted aliphatic alcohols, cycloaliphatic-substituted heterocyclic alcohols, heterocyclic-substituted aliphatic alcohols, heterocyclic-substituted cycloaliphatic alcohols, and heterocyclic-substituted aromatic alcohols. Alkyl and alkenyl groups are the preferred aliphatic hydrocarbon substituents.

The alcohols may contain non-hydrocarbon substituents or groups which do not interfere with the reaction of the alcohols with the hydrocarbyl-substituted succinic acids or anhydrides of this invention. Such non-hydrocarbon substituents or groups include lower alkoxy, lower alkyl, mercapto, nitro, and interrupting groups such as —O— and —S— (e.g., as in such groups as —CH$_2$CH$_2$—XCH$_2$CH$_2$ where X is —O— or —S—).

Further specific examples of monohydric alcohols which may be used include monohydric alcohols such as methanol, ethanol, isooctanol, dodecanol, cyclohexanol, cyclopentanol, behenyl alcohol, hexatriacontanol, neopentyl alcohol, isobutyl alcohol, benzyl alcohol, beta-phenylethyl alcohol, 2-methylcyclohexanol, beta-chloroethanol, monomethyl ether of ethylene glycol, monobutyl ether of ethylene glycol, monopropyl ether of diethylene glycol, monododecyl ether of triethylene glycol, monooleate of ethylene glycol, monostearate of diethylene glycol, sec-pentyl alcohol, tert-butyl alcohol, 5-bromo-dodecanol, nitro-octadecanol, and dioleate of glycerol. Alcohols useful in this invention may be unsaturated alcohols such as allyl alcohol, cinnamyl alcohol, 1-cyclohexene-3-ol and oleyl alcohol.

Monohydric phenols and naphthols are usable as alcohols in the present invention. These hydroxy-substituted aromatic compounds may contain other substituents in addition to the hydroxy substituents such as halo, alkyl, alkenyl, alkoxy, alkylmercapto, nitro and the like. The aromatic hydroxy compounds are illustrated by the following specific examples: phenol, p-chlorophenol, p-nitrophenol, beta-naphthol, alpha-naphthol, and cresols. Aliphatic hydrocarbon-substituted phenols, e.g., alkylated phenols having up to 3 aliphatic hydrocarbon substituents are useful. Each of the aliphatic hydrocarbon substituents may contain about 100 or more carbon atoms but usually will have from 1 to about 20 carbon atoms.

Useful derivatives of polyoxyalkylene alcohols, which have only a single hydroxide free may be classified as mono-alcohols. Such alcohols include the hydrocarbyl ethers and the carboxylic acid esters obtained by reacting the alcohols with various carboxylic acids may include monobasic, aliphatic or aromatic carboxylic acid of up to about 20 carbon atoms such as acetic acid, propionic acid, valeric acid, oleic acid, lauric acid, stearic acid, benzoic acid, and the like. Illustrative hydrocarbyl groups are alkyl, cycloalkyl, alkylaryl, aralkyl, alkylaryl alkyl, etc., containing up to about 40 carbon atoms. Specific hydrocarbyl groups include methyl, butyl, dodecyl, tolyl, phenyl, naphthyl, dodecylphenyl, p-octylphenyl ethyl, cyclohexyl, and the like. The monoethers of these alkylene glycols and polyoxyalkylene glycols may be represented by the formula

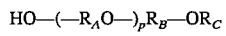

wherein R$_A$ and R$_B$ are independently alkylene groups of from about 2 to 8 carbon atoms; and R$_C$ is aryl (e.g., phenyl), lower alkoxy phenyl, or lower alkyl phenyl, or lower alkyl (e.g., ethyl, propyl, tertbutyl, pentyl, etc.); and aralkyl (e.g., benzyl, phenylethyl, phenylpropyl, p-ethylphenylethyl, etc.); p is from zero to about eight, preferably from about 2 to 4. Polyoxyalkylene glycols where the alkylene groups are ethylene or propylene and p is at least two as well as the monoethers thereof as described above are useful.

Polyols:

The polyols or polyhydric alcohols which may be reacted with the hydrocarbyl substituted succinic acylating agents include those compounds of the general formula:

wherein R$_1$ is a monovalent or polyvalent organic group joined to the —OH groups through carbon-to-oxygen bonds (that is, —COH wherein the carbon is not part of a carbonyl group) and m is an integer of from 2 to about 10, preferably 2 to about 6. These alcohols may be aliphatic, cycloaliphatic, aromatic, and heterocyclic, including aliphatic-substituted cycloaliphatic alcohols, aliphatic-substituted aromatic alcohols, aliphatic-substituted heterocyclic alcohols, cycloaliphatic-substituted aliphatic alcohols, cycloaliphatic-substituted heterocyclic alcohols, heterocyclic-substituted aliphatic alcohols, heterocyclicsubstituted cycloaliphatic alcohols, and heterocyclic-substituted aromatic alcohols. They are illustrated, for example, by the alkylene glycols and polyoxyalkylene glycols mentioned above such as ethylene glycol, diethylene glycol, triethylene glycol, tetraethylene glycol, dipropylene glycol, tripropylene glycol, dibutylene glycol, tributylene glycol, and other alkylene glycols and polyoxyalkylene glycols in which the alkylene groups contain from 2 to about 8 carbon atoms.

Other useful polyhydric alcohols include glycerol, monooleate of glycerol, monostearate of glycerol, monomethyl ether of glycerol, pentaerythritol, n-butyl ester of 9,10-dihydroxy stearic acid, methyl ester of 9,10-dihydroxy stearic acid, 1,2-butanediol, 2,3-hexanediol, 2,4-hexanediol, pinacol, erythritol, arabitol, sorbitol, mannitol, 1,2-cyclohexanediol, trimethylol propane, and xylene glycol. Carbohydrates such as sugars, starches, celluloses, and so forth likewise may be used. The carbohydrates may be exemplified by glucose, fructose, sucrose, rhamose, mannose, glyceraldehyde, and galactose.

Except for the polyoxyalkylene alcohols, the polyhydric alcohols corresponding to the formula R$_1$(OH)$_m$ preferably contain not more than about 40 carbon atoms, more preferably not more than about 20 carbon atoms. The alcohols may contain non-hydrocarbon substituents or groups which do not interfere with the reaction of the alcohols with the hydro carbyl substituted succinic acids or anhydrides of this invention. Such non-hydrocarbon substituents or groups include lower alkoxy, lower alkyl, mercapto, nitro, and interrupting groups such as —O— and —S— (e.g., as in such groups as —CH$_2$CH$_2$—XCH$_2$CH$_2$ where X is —O— or —S—).

Useful polyoxyalkylene alcohols include several alcohols which are commercially available from various sources; e.g., PLURONICS, polyols available from Wyandotte Chemicals Corporation; POLYGLYCOL 112-2, a liquid triol derived from ethylene oxide and propylene-oxide available from Dow Chemical Co.; and TERGITOLS, dodecylphenyl or nonylphenyl polyethylene glycol ethers, and UCONS, polyalkylene glycols, both available from Union Carbide Corporation.

Alcohols useful in this invention also include alkylene glycols and polyoxyalkylene alcohols such as polyoxyethylene alcohols, polyoxypropylene alcohols, polyoxybutylene alcohols, and the like. These polyoxyalkylene alcohols (sometimes called polyglycols) may contain up to about 150 oxyalkylene groups, with the alkylene group containing from about 2 to about 8 carbon atoms. Such polyoxyalkylene alcohols are generally dihydric alcohols. That is, each end of the molecule terminates with an OH group.

The polyhydric alcohols useful in this invention include polyhydroxy aromatic compounds. Polyhydric phenols and naphthols are useful hydroxyaromatic compounds. These hydroxy-substituted aromatic compounds may contain other substituents in addition to the hydroxy substituents such as halo, alkyl, alkenyl, alkoxy, alkylmercapto, nitro and the like. Usually, the hydroxy aromatic compound will contain from 2 to about 4 hydroxy groups. The aromatic hydroxy compounds are illustrated by the following specific examples: resorcinol, catechol, p,p'-dihydroxy-biphenyl, hydroquinone, pyrogallol, phloroglucinol, hexylresorcinol, orcinol, 4,4'-methylene-bis-methylene-bis-phenol etc. Alkylated phenols having 2 or more hydroxy substituents and 3 aliphatic hydrocarbon substituents are useful. Each of the aliphatic hydrocarbon substituents may contain about 100 or more carbon atoms but usually will have from 1 to about 20 carbon atoms.

Polyhydric alcohols having at least 3 hydroxyl groups, some, but not all of which have been esterified with an aliphatic monocarboxylic acid having from about 8 to about 30 carbon atoms such as octanoic acid, oleic acid, stearic acid, linoleic acid, dodecanoic acid or tall oil acid are useful as set forth above, if only one hydroxyl group remains unesterified, the alcohols are considered to be mono alcohols. On the other hand, if two or more hydroxyl groups remain unesterified, the the alcohols are considered to be polyols. Further specific examples of such partially esterified polyhydric alcohols are the monooleate of sorbitol, monooleate of glycerol, monostearate of glycerol, di-dodecanoate of erythritol, and the like.

Useful alcohols also include those polyhydric alcohols containing up to about 12 carbon atoms, and especially those containing from about 3 to about 10 carbon atoms. This class of alcohols includes glycerol, erythritol, pentaerythritol, dipentaerythritol, gluconic acid, glyceraldehyde, glucose, arabinose, 1,7-heptanediol, 2,4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, mannitol, sorbitol, 2-hydroxymethyl-2 -methyl-1,3-propanediol(trimethylolethane), 2-hydroxymethyl-2-ethyl-1,3-propanediol(trimethylopropane), and the like.

A particularly useful group of molecules are the substituted oxazolines. These molecules are particularly useful where it is desired to form an emulsifier in which two different types of succinic acylating agents, for example, a high and a low molecular weight succinic acylating agents. These substituted oxazolines may be represented by the formula:

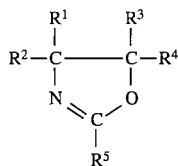

wherein in Formula (I), $R^1$, $R^2$, $R^3$, $R^4$ and $R^5$ are independently (i) hydrogens, (ii) hydrocarbyl groups, (iii) hydroxy-substituted hydrocarbyl groups, (iv) hydroxy-substituted poly(hydrocarbyloxy) groups, (v) amino-substituted hydrocarbyl groups or (vi) amino-substituted poly(hydrocarbyloxy) groups, with the proviso that at least two of $R^1$, $R^2$, $R^3$, $R^4$ and $R^5$ are independently (iii), (iv), (v) or (vi).

In Formula (I), $R^1$, $R^2$, $R^3$, $R^4$ and $R^5$ independently may contain up to about 50 carbon atoms, more preferably up to about 30 carbon atoms. In one embodiment, $R^1$ and $R^2$ are independently hydroxy alkyl groups of up to about 6 carbon atoms, $R^3$ and $R^4$ are independently hydrogen or alkyl groups of up to about 6 carbon atoms, and $R^5$ is a hydrocarbyl group of up to about 50 carbon atoms. In one embodiment, $R^1$ and $R^2$ are independently hydroxy methyl or hydroxy ethyl groups, $R^3$ and $R^4$ are independently hydrogen, methyl or ethyl, and $R^5$ is a hydrocarbyl group of about 10 to about 30 carbon atoms. In one embodiment, $R^1$ and $R^2$ are each hydroxy methyl groups, $R^3$ and $R^4$ are each hydrogen, and $R^5$ is an alkyl or an alkenyl group of about 12 to about 22 carbons. In one embodiment, $R^1$ and $R^2$ are each hydroxy methyl groups, $R^3$ and $R^4$ are each hydrogen, and $R^5$ is an alkyl or an alkenyl group of about 16 to about 18 carbons. An example of a commercially available oxazoline that is useful as component (C)(I) is Alkaterge-T which is a product of Angus Chemical Company, Northbrook, Ill., and is identified as having the following structure:

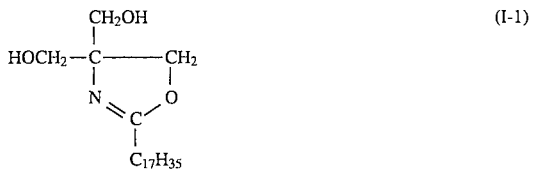

An example of a commercially available material of this type that may be used is Alkaterge T-IV which is a product of Angus Chemical identified as having the formula:

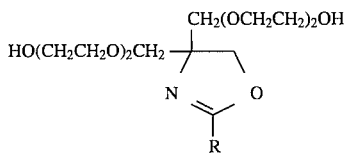

wherein in Formula (I-2), R is a hydrocarbyl group of up to about 30 carbon atoms.

III. COUPLED OF DIFFERENT SUCCINIC ACYLATING AGENTS

In one embodiment, two different types of succinic derivatives are coupled together by a bridging molecule. For example, a high and low molecular weight succinic acylating agents may be coupled together. A particularly favored embodiment is a salt composition in which high and low molecular weight succinic acylating agents are coupled together. There may be more than one high molecular weight species and more than one low molecular weight species in the composition. The first acylating agent is a high-molecular weight succinic acylating agent having at least one hydrocarbyl substituent having an average of from about 20 to about 500 carbon atoms. The second acylating agent is a low molecular weight succinic acylating agent optionally having at least one hydrocarbyl substituent having an average of up to about 18 carbon atoms.

The coupling group is provided by at least one compound having (i) two or more primary amino groups, (ii) two or more secondary amino groups, (iii) at least one primary amino group and at least one secondary amino group, (iv) at least two hydroxyl groups or (v) at least one primary or secondary amino group and at least one hydroxyl group. The bases which form the salts of the high and low molecular weight succinic acylating agents include ammonia, amines, at alkali or alkaline earth metals, and alkali or alkaline earth metal compounds.

Coupling molecules:

The coupling component acts as a bridge between the low and the high molecular weight succinic acid molecules. The low and high molecular weight molecules may be mixed together, and are reacted with the bridging molecule. All possible linked products are formed, that is, the product in which a coupling, or bridging molecule acts as a bridge between a low and a high molecular weight species, the product in which a coupling molecule acts as a bridge between two low molecular weight succinic agents and the product in which a coupling molecule acts as a bridge between two high molecular weight succinic agents. The coupling molecule may be any compound having (i) two or more primary amino groups, (ii) two or more secondary amino groups, (iii) at least one primary amino group and at least one secondary amino group, (iv) at least two hydroxyl groups, or (v) at least one primary or secondary amino group and at least one hydroxyl group. These include the polyamines, polyols and hydroxyamines disclosed above as coreactants.

Polyamines Useful as Coupling Molecules:

The polyamines useful as component (C) are characterized by the presence within their structure of at least two —NH$_2$ groups, at least two >NH groups, or at least one —NH$_2$ group and at least one >NH group.

These polyamines may be aliphatic, cycloaliphatic, aromatic or heterocyclic, including aliphatic-substituted aromatic, aliphatic-substituted cycloaliphatic, aliphatic-substituted heterocyclic, cycloaliphatic-substituted aliphatic, cycloaliphatic-substituted aromatic, cycloaliphatic-substituted heterocyclic, aromatic-substituted aliphatic, aromatic-substituted cycloaliphatic, aromatic-substituted heterocyclic, heterocyclic-substituted aliphatic, heterocyclic-substituted cycloaliphatic and heterocyclic-substituted aromatic amines. These amines may be saturated or unsaturated. If unsaturated, the amine is preferably free from acetylenic unsaturation. These amines may also contain non-hydrocarbon substituents or groups as long as these groups do not significantly interfere with the reaction of such amines with reactants (A)(I) and (B)(I). Such non-hydrocarbon substituents or groups include lower alkoxy, lower alkyl, mercapto, nitro, and interrupting groups such as —O— and —S— (e.g., as in such groups as

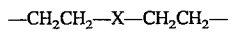

where X is —O— or —S—).

The polyamines include aliphatic, cycloaliphatic and aromatic polyamines analogous to the aliphatic, cycloaliphatic and aromatic monoamines described below except for the presence within their structure of at least one additional >NH or —NH$_2$ group. Suitable polyamines may readily selected, by those skilled in the art from the poly-amine co-reactants discussed above.

Polyols Useful as Coupling molecules:

The polyols or polyhydric alcohols useful as coupling molecules include those polyols disclosed as co-reactants for use in preparing emulsifiers. Alkylene glycols, polyoxyalkylene glycols, are particularly useful.

Hydroxyamines Useful as Coupling Molecules:

The hydroxyamines useful as coupling molecules may be primary or secondary amines. They may also be tertiary amines provided said tertiary amines also contain at least two hydroxyl groups. These hydroxyamines contain at least two >NH groups, at least two —NH$_2$ groups, at least one —OH group and at least one >NH or —NH$_2$ group, or at least two —OH groups. The terms "hydroxyamine" "alkanol amines," and "aminoalcohol" describe the same class of compounds and, therefore, may be used interchangeably. Such hydroxyamines may be readily selected, by those skilled in the art from the alkanol amines disclosed as co-reactants for use in preparing the emulsifiers useful in the present invention.

The substituted oxazolines discussed above are particularly useful as coupling molecules to bridge different hydrocarbyl substituted acylating agents. As set forth above, the oxazolines have two or more amino, hydroxyl, or combinations of amino and hydroxyl substituents. These substituents allow the ozaxoline to act as a bridging molecule.

In a favored embodiment, the different succinic acylating agents are coupled by a bridging molecule, and the remaining carboxyl groups are reacted with ammonia, and amine or a metal compound to form a salt. The favored metals are the alkali metals, the alkaline earth metals, and the like.

IV. FORMATION OF THE EMULSIFIER:

The emulsifier compositions of the invention are prepared by reacting the hydrocarbyl substituted succinic acylating agent with one or more of the co-reactants listed above. The hydrocarbyl substituted succinic acylating agent may be either the acid or the anhydride. If the acylating agent is a hydrocarbyl substituted succinic acid, each carboxyl group is free to react with a co-reactant. If the acylating agent is an anhydride, the first reaction is the opening of the anhydride ting by the ammonia, amine, alcohol or phenol. This first step produces either an amide or an ester. The initial ring opening, using either an amine or an alcohol reaction occurs under fairly mild conditions, that is, at a temperature of about 80° C. to about 110° C.

In addition to the ester or amide group, the product of the initial reaction contains an unreacted carboxyl group. This carboxyl group is able to undergo further reactions either with a hydroxyl group to form additional ester groups, or with an amine to form amides or carboxylate/amine salts. Except for salt formation, the reaction of the second carboxyl to form further products requires condensing conditions, that is, higher temperatures typically from about 110° C. to about 200° C. A salt may be formed by reacting the second carboxyl group, under non-condensing or salt forming conditions, with amines, including tertiary amines, alcohols, alkanol amines, and metals. The metals which may be used for salt formation include the alkali metals, the alkaline earth metals, and the like. A salt may be formed from the second carboxyl group under non-condensing conditions, that is, temperatures from about 30° C. to about 60° C.

The reactions which actually occur during the formation of the emulsifiers of the present invention involve complex combinations of the basic reactions shown above. For example, an amine may react with one or both carboxyl groups of the hydrocarbyl substituted succinic acylating agent. An amine may form mixtures of salts, amide and imides. A polyfunctional compound may react with more than one hydrocarbyl substituted succinic acylating agent. One carboxyl group may react with one reactive site (amine or alcohol group) on a polyfunctional molecule while second site on the polyfunctional molecule reacts with the second carboxyl group of the hydrocarbyl substituted succinic acylating agent. A polyfunctional material may be used to form a bridge between succinic groups with different types of substituents. Mixtures of amines and alcohols may be reacted with mixtures of hydrocarbyl substituted succinic acylating agents. Finally the reaction products may be post treated in various ways. For example, if a polyamine is used in the to react with the hydrocarbyl substituted succinic acylating agent, there may be unreacted amine groups in the final product. These amine groups could be reacted with another acid to form salts. By proper selection of the quantities of co-reactant it is possible to produce an intermediate product which contains unreacted carboxyl groups. These carboxyl groups could be reacted with a base to form a salt or left in the acid form.

The ratio of reactants utilized in the preparation of the inventive emulsifier compositions may be varied over a wide range. Generally, for each equivalent of each of the acylating agents from about 0.1 to about 2 equivalents or more of coreactant are used.

The number of equivalents of the acylating agents depends on the total number of carboxylic functions present. In determining the number of equivalents for the acylating agent, those carboxyl functions which are not capable of reacting as a carboxylic acid acylating agent are excluded. In general, however, there is one equivalent of acylating agent for each carboxy group in these acylating agents. For example, there would be two equivalents in an anhydride derived from the reaction of one mole of olefin polymer with one mole of maleic anhydride. Conventional techniques are readily available for determining the number of carboxyl functions (e.g., acid number, saponification number) and, thus, the number of equivalents of each of the acylating agents may be readily determined by one skilled in the art.

For reactions which involve the amine, an equivalent weight of the amine is the molecular weight of the amine divided by the total number of nitrogens present in the molecule.

For reactions which involve the hydroxide group, the equivalent weight of the alcohol is the molecular weight of the alcohol divided by the total number of hydroxides present in the molecule.

V. TYPES OF EMULSIFIERS

There are several basic types of emulsifiers which may be formed from a hydrocarbyl substituted succinic acylating agent. It will be appreciated by those skilled in the art that within each basic type of emulsifier, the hydrocarbyl substituted succinic acylating agent and the coreactants may be varied, and the conditions of reaction varied to yield a wide variety of products which provide the desired emulsifier performance.

It will also be appreciated by those skilled in the art that the formation of the basic types of emulsifiers is accompanied by some side reactions which yield some amounts of side reaction products which do not interfere with the performance of the emulsifiers. For example, in reactions involving polyamines, the amine may undergo attack at more than one site and thereby lead to partially polymerized side products. After a polyamine has reacted with a succinic acid derivative, the amine may undergo internal attack by the remaining carboxyl group of the succinic acid derivative. Such a reaction may lead to various ring structures. In reactions starting with succinic anhydride there may be some hydrolysis to form the acid. The succinic acid may then undergo its typical reactions. These side reactions are well understood by those skilled in the art and do not produce products which interfere with the emulsifying action of the material produced.

For clarity, the basic emulsifiers are shown in the following equations with only one succinic group on each substituent group. This is a correct representation for certain hydrocarbyl substituted succinic acylating agents. However, there are some succinic acylating agents which have an average of more than one succinic group on each chain. For such a succinic acylating agent, there may be molecules of succinic acylating agent which have one succinic group, and molecules which have more than one succinic group. When the molecules containing more than one succinic group are reacted with a coreactant, each succinic group may react independently and form derivatives. Accordingly, in the following discussion of the basic types of emulsifiers it should be understood that within each type, it is possible to use succinic acylating agents which contain molecules with more than one succinic group per molecule.

One basic type of emulsifier is formed by reacting a hydrocarbyl substituted succinic anhydride acylating agent with one or more tertiary alkanol amines under condensing conditions. In this case, the anhydride ring is opened by the alcohol to form an ester. The remaining carboxyl group reacts with a second molecule of the alkanol amine to form an ester. Mixtures of alkanol amines may be used.

SUBSTITUTED SUCCINIC ANHYDRIDE + TERTIARY ALKANOL AMINES
(condensing conditions)

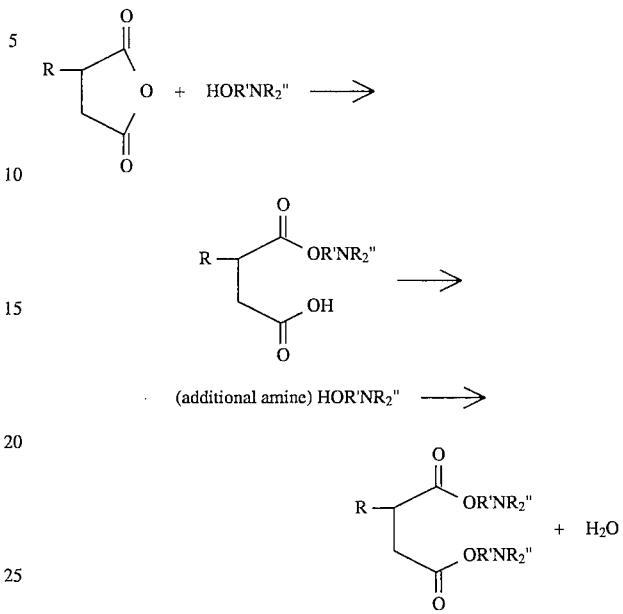

wherein R is a is a hydrocarbyl group, and HOR'NR$_2$" is a tertiary alkanol amine. Although, for simplicity, equation 1 shows a single tertiary alkanol amine, it is to be understood that a mixture of two or more tertiary alkanol amines may be used in preparing this type of emulsifier.

Another basic type of emulsifier may be formed by reacting a hydrocarbyl substituted succinic anhydride with one or more secondary amines. In this case, the anhydride ring is opened by the amine to form an amide. The remaining carboxyl group reacts with a second molecule of the secondary amine to form an amide salt. If the reaction is conducted under non-condensing conditions, the amide salt is the final product. Ammonia, amines, and metal such as the alkali metals, alkaline earth metals and the like may be added as the salt forming reagent. Under condensing conditions, some or all of the amide salt is converted to a di-amide. Accordingly, the product of the reaction may be a amide salt, a di-amide, or mixtures of the amide salt and the di-amide.

SUBSTITUTED SUCCINIC ANHYDRIDE + SECONDARY AMINES

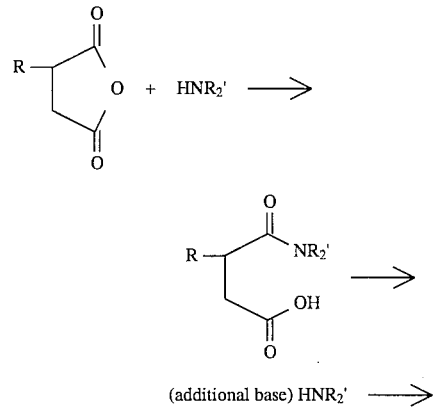

SUBSTITUTED SUCCINIC ANHYDRIDE +
SECONDARY AMINES
-continued

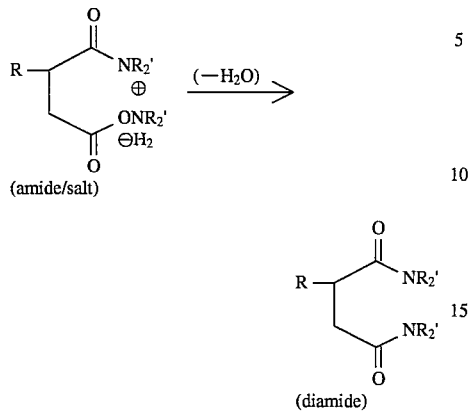

(amide/salt)

(diamide)

wherein R is a is a hydrocarbyl group, and $HNR_2'$ is a secondary amine. Although, for simplicity, equation 2 shows a single secondary amine, it is to be understood that a mixture of two or more secondary amines may be used in preparing this type of emulsifier.

Another basic type of emulsifier is formed by reacting a hydrocarbyl substituted succinic anhydride with one or more secondary alkanol amines under condensing conditions. In this case, the anhydride ring may be opened by either the alcohol to form an ester or by the amine to form an amide. The remaining carboxyl group reacts with either the amine or the alcohol portion of a second molecule of the alkanol amine. The remaining carboxyl group may also form an internal salt. An internal salt is formed in cases where the anhydride ring was opened by the alcohol portion of the alkanol amine to form an ester. The amino group from the alkanol amine, which formed the ester, then reacts with the remaining carboxyl group of the hydrocarbyl substituted succinic acylating agent to form an internal salt. An external salt may be formed when amino group from another alkanol amine molecule, which is not attached to the acylating agent, reacts with the remaining carboxyl group of the hydrocarbyl substituted succinic acylating agent. Under condensing conditions, this type of external salt may eliminate water to form a di-ester or an ester amide. Addition materials such as ammonia, amines, and metal such as the alkali metals, alkaline earth metals and the like may be added as the salt forming reagent. If the anhydride ring is opened to form an amide, the free carboxyl may react with further base to form an amide salt. Under condensing conditions, the amide salt may eliminate water to form the di-amide. Mixtures of alkanol amines may be used.

SUBSTITUTED SUCCINIC ANHYDRIDE +
SECONDARY ALKANOL AMINES

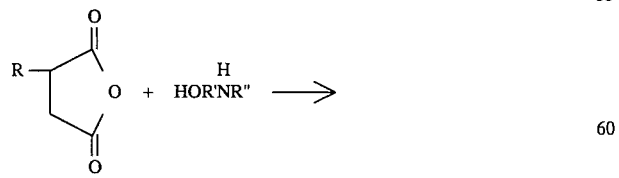

SUBSTITUTED SUCCINIC ANHYDRIDE +
SECONDARY ALKANOL AMINES
-continued

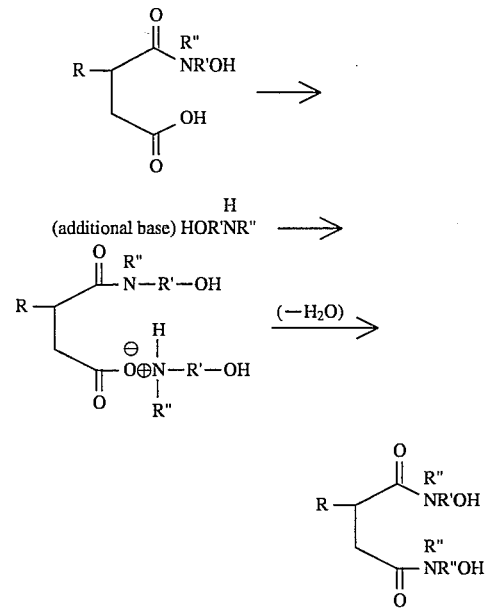

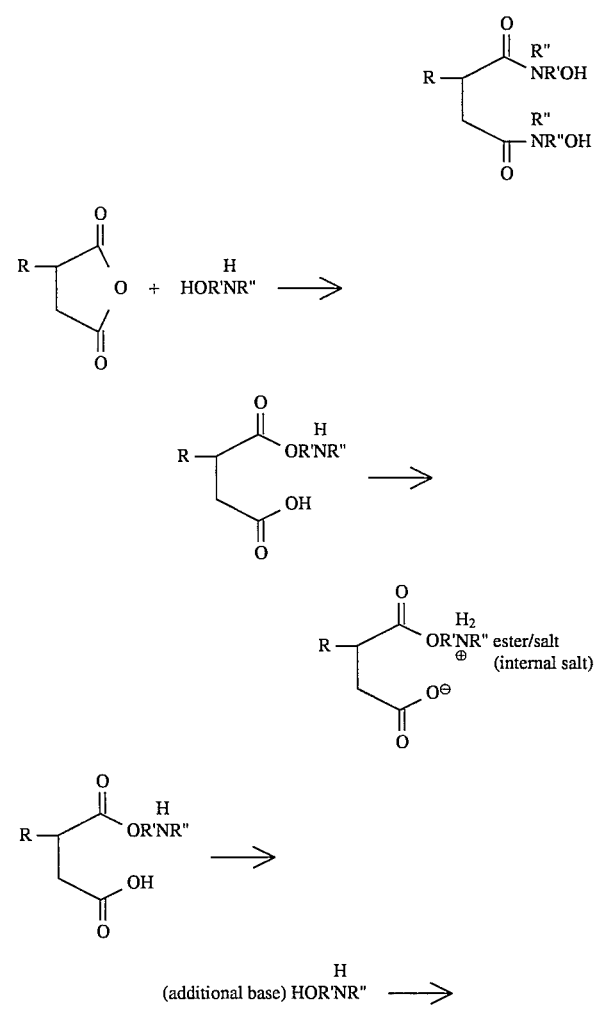

-continued
SUBSTITUTED SUCCINIC ANHYDRIDE + SECONDARY ALKANOL AMINES

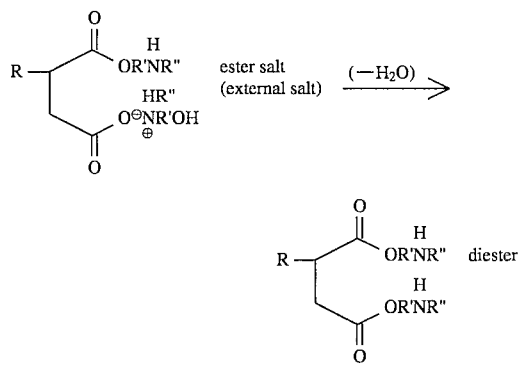

wherein R is a is a hydrocarbyl group, and HOR'HNR" is a secondary alkanol amine. Although, for simplicity, equation 3 shows a single secondary alkanol amine, it is to be understood that a mixture of two or more secondary alkanol amines may be used in preparing this type of emulsifier.

Another basic type of emulsifier may be formed by reacting a hydrocarbyl substituted succinic anhydride with one or more primary amines. In this case, the anhydride ring is opened by the amine to form an amide. The amide may react, under condensing conditions to form an imide by the elimination of water. If sufficient amine is present, the remaining carboxyl group may react with a second molecule of the primary amine to form an amide salt. In addition, ammonia, other amines, or metals such as alkali metals, alkaline earth metals and the like may be added as salt forming reagents. Under condensing conditions, some or all of the amide salt is converted to a di-amide. Accordingly, the product of the reaction may be an imide, an amide salt, a di-amide, or mixtures of the imide, the amide salt and the di-amide.

SUBSTITUTED SUCCINIC ANHYDRIDE + PRIMARY AMINES

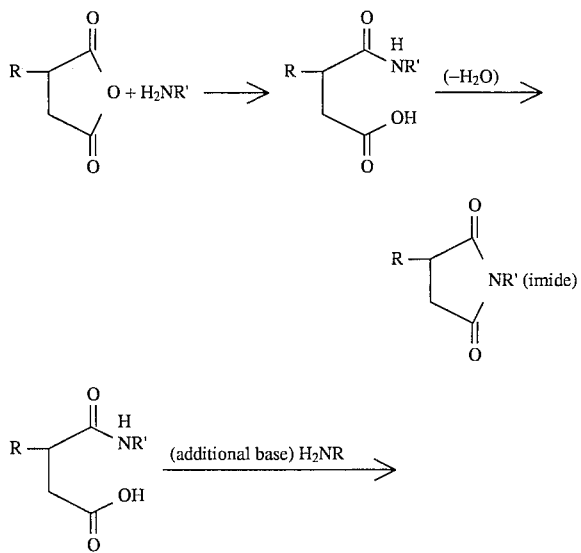

-continued
SUBSTITUTED SUCCINIC ANHYDRIDE + PRIMARY AMINES

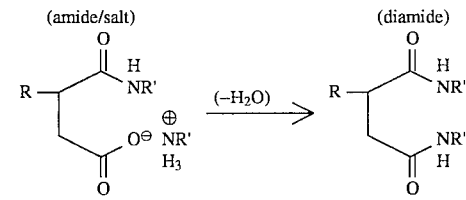

wherein R is a is a hydrocarbyl group, and $H_2NR'$ is a primary amine. Although, for simplicity, equation 4 shows a single primary amine, it is to be understood that a mixture of two or more primary amines may be used in preparing this type of emulsifier.

Another basic type of emulsifier is formed by reacting a hydrocarbyl substituted succinic anhydride with one or more primary alkanol amines under condensing conditions. In this case, the anhydride ring may be opened by either the alcohol to form an ester or by the amine to form an amide. The remaining carboxyl group reacts with either the amine or the alcohol portion of a second molecule of the alkanol amine. The remaining carboxyl group may also form an internal salt. An internal salt is formed in cases where the anhydride ring was opened by the alcohol portion of the alkanol amine to form an ester. The amino group from the alkanol amine, which formed the ester, then reacts with the remaining carboxyl group of the hydrocarbyl substituted succinic acylating agent to form an internal salt. An external salt may be formed when amino group from another alkanol amine molecule, which is not attached to the acylating agent, reacts with the remaining carboxyl group of the hydrocarbyl substituted succinic acylating agent. In addition, ammonia, an amine or metals such as alkali metals, alkaline earth metals and the like may be added as the salt forming reagent. Under condensing conditions, the external salt may eliminate water to form a di-ester or an ester amide or mixtures of these products. If the anhydride ring is opened to form an amide, an amide acid containing both an amide and a free carboxyl group is formed. The free carboxyl may react with the amide to form an imide. The free carboxyl may also react with further base to form an amide salt. Under condensing conditions, the amide salt may eliminate water to form the di-amide. Mixtures of alkanol amines may be used.

SUBSTITUTED SUCCINIC ANHYDRIDE + PRIMARY ALKANOL AMINES

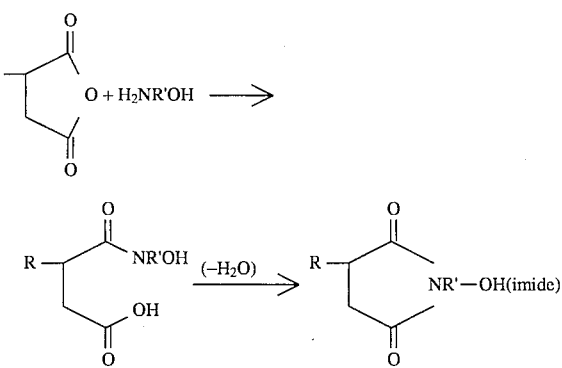

SUBSTITUTED SUCCINIC ANHYDRIDE + PRIMARY ALKANOL AMINES -continued

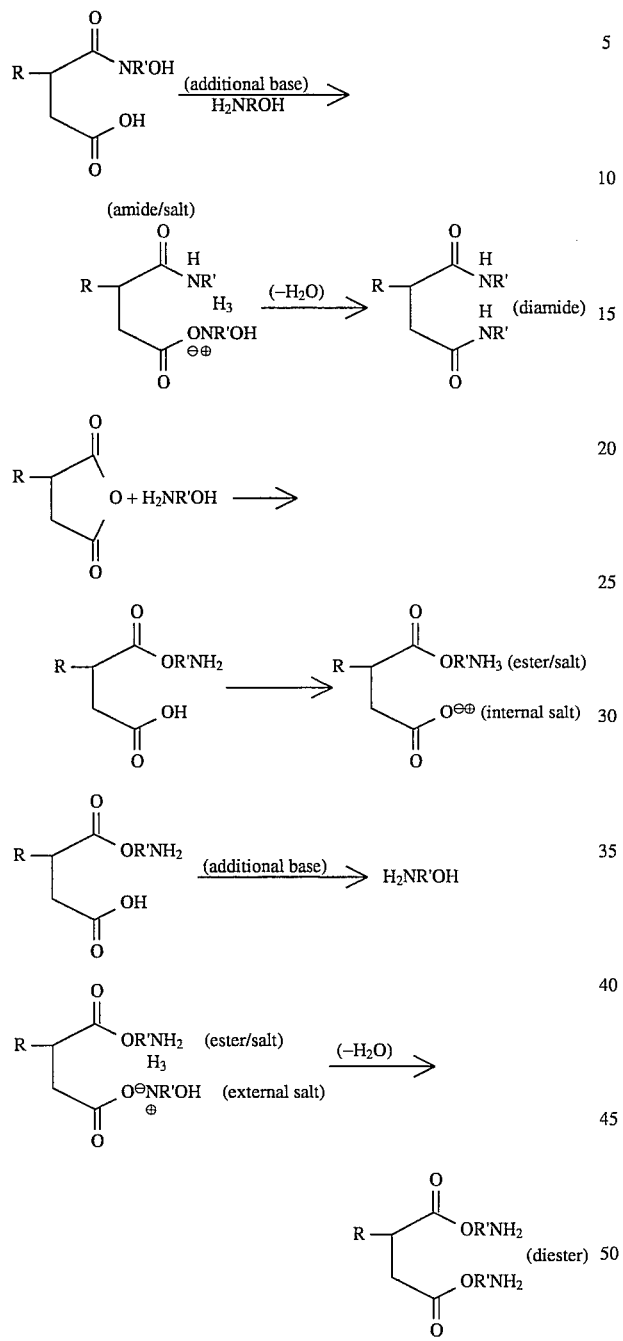

wherein R is a is a hydrocarbyl group, and HOR'NH$_2$ is a primary alkanol amine. Although, for simplicity, equation 5 shows a single primary alkanol amine, it is to be understood that a mixture of two or more primary alkanol amines may be used in preparing this type of emulsifier.

Another basic type of emulsifier is formed by reacting, under condensing conditions, a hydrocarbyl substituted succinic anhydride with one or more polymines, which contain a primary amine group. In this case, the anhydride ring is opened by the amine to form an amide which react with the remaining carboxyl group to form an imide. The remaining amine functions of the polyamine are free to react with acids to form salts. Any acid capable of reacting with an amine may be employed, including mineral and organic acids, including carboxylic acids, hydrochloric acid, sulfuric acid, and phosphoric acid.

SUBSTITUTED SUCCINIC ANHYDRIDE + POLYAMINES + ACIDS

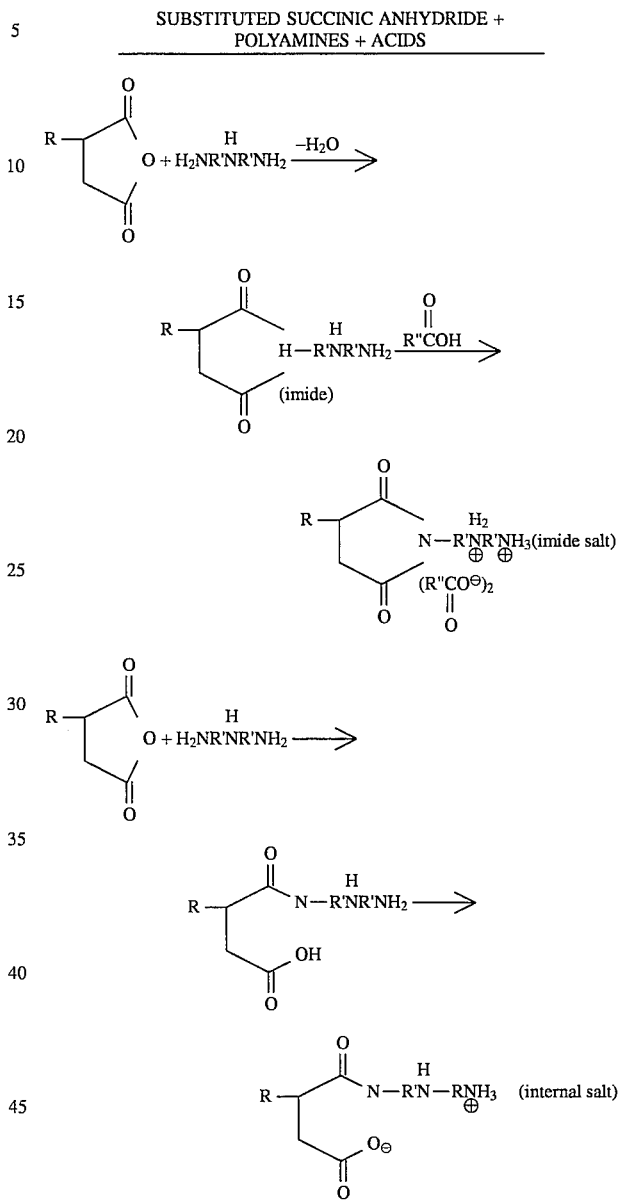

wherein R is a is a hydrocarbyl group, and H$_2$NR'NHR'NH$_2$ is a poly-amine. Although, for simplicity, equation 6 shows a single poly-amine, it is to be understood that a mixture of two or more poly-amines may be used in preparing this type of emulsifier.

Another basic type of emulsifier is formed by reacting a hydrocarbyl substituted succinic anhydride with one or more alcohols polyols and one or more amines including tertiary alkanol amines under non-condensing conditions. If the hydrocarbyl substituted succinic anhydride acylating agent is reacted with a mixture of alcohols and amines, a mixture of amides and esters and salts would be produced. However, it is preferred to run the reaction sequentially by exposing the acylating agent first to the alcohol and then to the amine. In this case, the anhydride ring is opened by the alcohol to form an ester. The remaining carboxyl group reacts with the amine to form a salt. If the reaction is conducted under conditions which could lead to some condensation, small quantities of other products such as ester amides could be produced.

SUBSTITUTED SUCCINIC ANHYDRIDE + ALCOHOL + AMINE

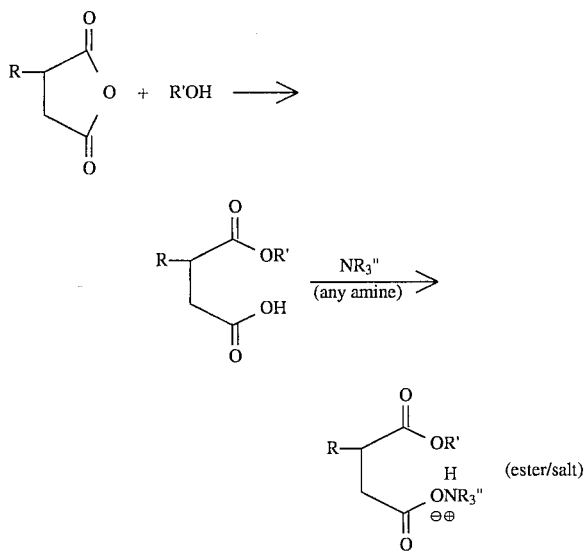

wherein R is a is a hydrocarbyl group, and R'OH is an alcohol and $R_3''N$ may be a primary, secondary or tertiary amine. Although, for simplicity, equation 7 shows a single amine and a single alcohol, it is to be understood that a mixture of two or more amines and two or more alcohols may be used in preparing this type of emulsifier for simplicity, only single alcohols are shown. However polyols may be readily used in preparing this type of emulsifier.

Another basic type of emulsifier may be formed by reacting a hydrocarbyl substituted succinic acid with one or more amines of any type. In this case, the both carboxyl groups of the hydrocarbyl substituted succinic group react with the amine to form salts. The product is the di-salt.

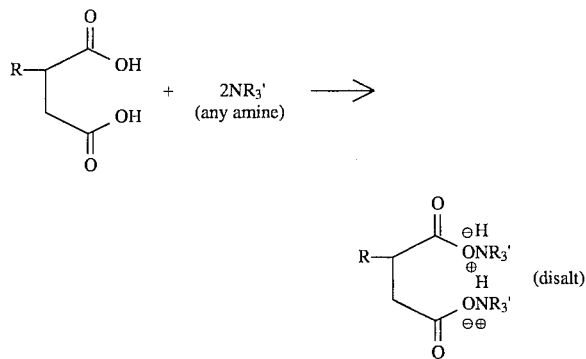

wherein R is a is a hydrocarbyl group, and $HNR_2'$ is a secondary amine. Although, for simplicity, equation 8 shows a single secondary amine, it is to be understood that a mixture of two or more secondary amines may be used in preparing this type of emulsifier.

Another basic type of emulsifier may be formed by reacting two different hydrocarbyl substituted succinic acid acylating agents with any of the co-reactants discussed above and coupling the two groups with a coupling molecule. Alternatively, the succinic groups may be coupled first and subsequently reacted with a coreactant. In a favored embodiment, the two hydrocarbyl substituted succinic acylating agents are of different molecular weights, and the hydrocarbyl substituted succinic acylating agents are coupled together and reacted with ammonia, an amine, a metal, or a metal compound to form a salt. One or more low molecular weight hydrocarbyl-substituted succinic acid or anhydrides represented by the formulae:

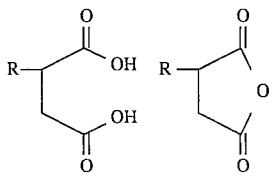

wherein R' is a $C_1$ to about a $C_{18}$ hydrocarbyl group may be used.

As the second substituted succinic acylating agents one or more high molecular weight hydrocarbyl-substituted succinic acid or anhydrides represented by the formulae:

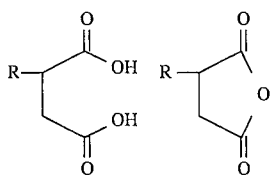

wherein R is a hydrocarbyl substituent containing from about 20 to about 500 carbon atoms may be used. Preferably R contains from about 30 to about 500 carbon atoms, more preferably from about 40 to about 500 carbon atoms, more preferably from about 50 to about 500 carbon atoms. The salt compositions of the invention may be prepared by initially reacting the high and low molecular weight acylating agents with the coupling molecule to form an intermediate, and thereafter reacting said intermediate with the salt forming components to form the desired salt. An alternative method of preparing these salt compositions involves reacting the high molecular weight acylating agent with the salt forming component to form a first salt moiety, separately reacting the low molecular weight acylating agent with the salt forming component to form a second salt moiety, then reacting a mixture of these two salt moieties with the coupling molecule.

The two hydrocarbyl substituted succinic acylating agents are coupled together by a coupling molecule which comprises at least one compound having (i) two or more primary amino groups, (ii) two or more secondary amino groups, (iii) at least one primary amino group and at least one secondary amino group, (iv) at least two hydroxyl groups or (v) at least one primary or secondary amino group and at least one hydroxyl group. Compounds which may be used include glycols, polyoxyalkalene glycols, polyols, polyamines, polyhydroxy aromatic compounds, and primary and secondary-alkanol amines. The glycols, polyoxyalkalene glycols, polyols, polyamines, polyhydroxy aromatic compounds, and primary and secondary alkanol amines disclosed above are suitable for use as the coupling molecule.

In forming coupled species between two different hydrocarbyl substituted succinic acylating agents, for example, a high and a low molecular weight hydrocarbyl substituted succinic acylating agent, a variety of molecules are formed. Thus, some molecules are formed in which two low molecular weight hydrocarbyl substituted succinic acylating agents are coupled together, and some molecules are formed in which two high molecular weight hydrocarbyl substituted succinic acylating agents are coupled together. However, the formation of the high and low molecular weight coupled product is statistically favored.

The salt forming components may be ammonia, any amine, polyamine, or alkanol amine disclosed above, and any metal or metal compound capable of forming a salt with a carboxylic acid. The salt forming components which are used to react with the different hydocarbyl substituted succinic acylating agents may be the same or different, but preferably are the same. The amines primary amines, secondary amines, tertiary amines, polyamines, and primary, secondary, and tertiary alkanol amines, discussed above, may all be used as salt forming species.

The hydroxyamines may also be an ether N-(hydroxysubstituted hydrocarbyl)amine. These are hydroxyl-substituted poly(hydrocarbyloxy) analogs of the above-described hydroxy amines (these analogs also include hydroxyl-substituted oxyalkylene analogs). Such N-(hydroxyl-substituted hydrocarbyl) amines may be conveniently prepared by reaction of epoxides with amines. Useful polyamines include the alkylene polyamines discussed above as well as alkylene polyamines with only one or no hydrogens attached to the nitrogen atoms. The preferred alkylene is ethylene or propylene.

The alkali and alkaline earth metals that are useful as components salt forming components may be any alkali or alkaline earth metal. The alkali metals are preferred. Sodium and potassium are particularly preferred. The alkali and alkaline earth metal compounds that are useful include, for example, the oxides, hydroxides and carbonates. Sodium hydroxide and potassium hydroxide are particularly preferred.

The ratio of reactants utilized in the preparation of the salt compositions may be varied over a wide range. Generally, for each equivalent of each of the acylating agents, at least about one equivalent of coupling molecule is used. From about 0.1 to about 2 equivalents or more of salt forming components are used for each equivalent of high and low molecular weight hydrocarbyl substituted succinic acylating agents. Generally the ratio of equivalents of high molecular weight hydrocarbyl substituted succinic acylating agent components to low molecular weight hydrocarbyl substituted succinic acylating agent is about 0.5 to about 2, with about 1:1 being preferred. Preferred amounts of the reactants are about 2 equivalents of the coupling molecule and from about 0.1 to about 2 equivalents of each salt forming components used with the high and low molecular weight acylating agents for each equivalent of each of high and low molecular weight acylating agents.

The number of equivalents of the hydrocarbyl substituted succinic acylating agent in a given material depends on the total number of carboxylic functions present in each. In determining the number of equivalents for each of the acylating agents those carboxyl functions which are not capable of reacting as a carboxylic acid acylating agent are excluded. In general, however, there is one equivalent of acylating agent for each carboxy group in these acylating agents. For example, there would be two equivalents per molecule for a hydrocarbyl substituted succinic anhydride derived from the reaction of one mole of olefin polymer and one mole of maleic anhydride. Conventional techniques are readily available for determining the number of carboxyl functions (e.g., acid number, saponification number) and, thus, the number of equivalents of each of the hydrocarbyl substituted succinic acylating agents may be readily determined by one skilled in the art.

The salt compositions of the invention may be prepared by initially reacting the hydrocarbyl substituted succinic acylating agents with coupling molecule to form an intermediate, and thereafter reacting said intermediate with salt forming component or components to form the desired salt. An alternative method of preparing these salt compositions involves reacting one hydrocarbyl substituted succinic acylating agent with a salt forming component to form a first salt moiety, separately reacting the other hydrocarbyl substituted succinic acylating agent with a salt forming component to form a second salt moiety, then reacting a mixture of these two salt moieties with the coupling molecule.

An equivalent weight of a polyamine is the molecular weight of the polyamine divided by the total number of nitrogens present in the molecule. If the polyamine is to be used as coupling component, tertiary amino groups are not counted. On the other hand, if the polyamine is to be used as a salt forming component, tertiary amino groups are counted. Thus, ethylene diamine has an equivalent weight equal to one-half of its molecular weight; diethylene triamine has an equivalent weight equal to one-third its molecular weight. The equivalent weight of a commercially available mixture of polyalkylene polyamine may be determined by dividing the atomic weight of nitrogen (14) by the % N contained in the polyamine; thus, a polyamine mixture having a % N of 34 would have an equivalent weight of 41.2. An equivalent weight of ammonia or a monoamine is its molecular weight.

An equivalent weight of polyhydric alcohol is its molecular weight divided by the total number of hydroxyl groups present in the molecule. Thus, an equivalent weight of ethylene glycol is one-half its molecular weight.

An equivalent weight of a hydroxyamine which is to be used as the coupling component is its molecular weight divided by the total number of —OH, >NH and —NH$_2$ groups present in the molecule. Thus, ethanolamine has an equivalent weight equal to one-half its molecular weight. On the other hand, if the hydroxyamine is to be used as a salt forming component an equivalent weight thereof would be its molecular weight divided by the total number of nitrogen groups present in the molecule. Thus, dimethylethanolamine, when used as salt forming component would have an equivalent weight equal to its molecular weight; ethanolamine would also have an equivalent weight equal to its molecular weight.

An equivalent weight of an alkali or alkaline earth metal is its molecular weight. An equivalent weight of an alkali or alkaline earth metal compound is its molecular weight divided by the number of alkali or alkaline earth metal atoms present in the molecule.

The hydrocarbyl substituted succinic acylating agents may be reacted with the coupling component according to conventional ester- and/or amide-forming techniques. This normally involves heating the hydrocarbyl substituted succinic acylating agents with the coupling component, optionally in the presence of a normally liquid, substantially inert, organic liquid solvent/diluent. Temperatures of at least about 30° C. up to the decomposition temperature of the reaction component and/or product having the lowest such temperature may be used. This temperature is preferably in the range about 50° C. to about 130° C., more preferably about 80° C. to about 100° C. when the hydrocarbyl substituted succinic acylating agents are anhydrides. On the other hand, when the hydrocarbyl substituted succinic acylating agents are acids, this temperature is preferably in the range of about 100° C. to about 300° C. with temperatures in the range of about 125° C. to about 250° C. often being employed.

For coupled products in which two different hydrocarbyl substituted succinic acylating agents are coupled through a coupling molecule, it is important that the final product contain at least some salt linkage to permit said product to be effective as an emulsifier in accordance with the invention. Preferably at least about 10%, more preferably at least about 30%, more preferably at least about 50%, more preferably at least about 70%, and advantageously up to about 100% of salt forming components that react with the hydrocarbyl substituted succinic acylating agents form a salt linkage. U.S. Pat. No. 4,828,633 discloses coupled emulsifiers, and is hereby incorporated by reference for its disclosure of components and methods used in preparing coupled emulsifiers.

The following examples illustrate the preparation of the compositions of this invention. Unless otherwise indicated, in the following examples and elsewhere in the specification and claims, all parts and percentages are by weight, SUS is an abbreviation for Saybolt Universal Seconds, a measure of viscosity, and all temperatures are in degrees centigrade.

EXAMPLE A

A mixture of 764.8 g of a hydrocarbyl-substituted succinic anhydride (Mw=984) and 483.0 g of a mineral oil were stirred and heated to 55°–65° C. The mixture was cooled to 40° C. with a water bath. 52.4 g monoethanolamine was added dropwise over 20 minutes, using water bath to control exotherm temperature between 40°–50° C. The material was held 4 hours @38°–41° C. after amine addition was completed.

EXAMPLE B

A mixture of 1039 g of a hydrocarbyl-substituted succinic anhydride (avg. Mw=1039) and 60 g isopropyl alcohol were heated and stirred 1.5 hours at 80°–91° C. With heat removed, 89 g dimethylethanolamine was added over 5 minutes and an exotherm of 86°–91° C. was observed. The reaction mixture was held 0.75 hours at 86°–91° C.

EXAMPLE C

To 2078 g of a hydrocarbyl-substituted succinic anhydride at 116° C. is added dropwise, with stirring, 174 g morpholine at such a rate as to maintain temperature between 116° and 126° C. with exotherm. The heating and stirring was continued for 1 hour @116°–126° C.

EXAMPLE D

A mixture of 248 g of mineral oil, 37 g of a commercial polyethylene polyamine mixture having a nitrogen content of 34% and 336 g of a hydrocarbylsubstituted succinic anhydride (avg. Mw=1039) is heated @150° C. for one hour and blown with $N_2$ for 5 hours. The product is filtered and the filtrate has a nitrogen content of 2.06%.

A mixture of the above and 62 g Unitol DSR$^{90}$ (a product of Union Camp Corporation identified as a tall oil acid) is heated at 80°–85° C. for 3 hours to provide the desired product.

EXAMPLE E 1000 grams of polyisobutenyl (Mn=950) substituted hydrocarbyl substituted succinic anhydride, 289.9 grams of $C_{16}$-substituted hydrocarbyl substituted succinic anhydride and 875.7 grams of a 40 SUS Neutral naphthenic oil are heated to 63°–68° C. 327.1 grams of Alkaterge-T are added. The mixture is heated to a temperature of 85°–91° C. with stirring and maintained at that temperature for 2–3 hours. 159.6 grams of dimethylethanolamine are added to the mixture. The mixture is maintained at 85°–91° C. for 2–3 hours. Eight grams of water are added to the mixture. The mixture is cooled to room temperature to provide the desired product.

EXAMPLE F

A mixture of 400 g., containing 25% oil, (0.428 equivalents) of a hydrocarbyl substituted succinic acid (avg. MW=1402), and 72.4 g. of a Pale 40 SUS neutral oil was heated, with stirring, to a temperature of 80° C. Diethylethanolamine, 50 g. (0.428 equivalents based on nitrogen), was added. An exotherm was observed. The temperature rose from 80° to 82° C. The mixture was heated and stirred for 3.75 hours at a temperature of 90°–97° C.

EXAMPLE G

A mixture of 931 g (0.83 equivalents) of a hydrocarbyl substituted succinic anhydride (avg. MW=1122), 272.5 g (0.83 equivalents) of a hydrocarbyl substituted succinic anhydride (avg. MW=328), and 694 g of a 100 SUS neutral oil (SSH-100) were heated to 90° C. with stirring and mixed until uniform. Ethylene glycol, 51.5 g (0.83 equivalents), was added over 5 minutes. There was no observable exotherm. The mixture was held and stirred for 2.5 hours at a temperature of 90°–105° C. Over a period of approximately 20 minutes, 148 g (1.66 equivalents) of dimethylethanolamine were added. During the first half of the addition an exotherm was observed. The temperature rose from 90° C. to 95° C. During the second half of the addition the temperature remained at 91° C. After addition of the dimethylethanolamine, the mixture was stirred for 2.5 hours at a temperature of 90°–103° C.

EXAMPLE H 1120 parts of polyisobutylene (number average molecular weight=950) substituted hydrocarbyl substituted succinic anhydride and 325 parts of a low molecular weight hydrocarbyl substituted succinic anhydride derived from one mole of a $C_{16}$ alpha-olefin and one mole of maleic anhydride are heated to a temperature of 93° C. with stirring and maintained at that temperature for one hour. 62 parts of ethylene glycol are added to the mixture. The mixture is maintained at a temperature of 93°–105° C. for 2 hours. 178 parts of dimethylethanolamine are added to the mixture over a period of 0.5 hour. The mixture is maintained at 93°–104° C. for 2.5 hours then cooled to 70° C. to provide the desired product.

EXAMPLE I

A mixture of 300 g. (0.289 equivalents) of a hydrocarbyl substituted succinic acid (avg. MW=1039), and 334.8 g. of a Pale 40 SUS neutral oil was heated, with stirring, to a temperature of 75° C. The heat source was removed and diethanolamine, 62.8 g. (0.597 equivalents based on nitrogen), was added, with stirring over a period of 10–15 minutes. An exotherm was observed. The temperature rose to 78° C. The mixture was heated and stirred for 4 hours at a temperature of 113°–116° C.

EXAMPLE J

A mixture of 300.4 g. (0.289 equivalents) of a hydrocarbyl substituted succinic acid (avg. MW=1039), and 312.0 g. of a 40 SUS neutral oil was heated, with stirring, to a temperature of 75°–85° C. The heat source was removed and diethanolamine, 37.3 g. (0.355 equivalents based on nitrogen), was added, with stirring over a period of 10 minutes. An exotherm was observed. The temperature rose to 78° C. The mixture was heated and stirred for 4 hours at a temperature of 113°–115° C.

EXAMPLE K

An emusifier is formed which is a mixture of 1 part of component K-1 and 9 parts of K-2.

K-1 A mixture of 350 g. of a hydrocarbyl substituted succinic anhydride (avg. MW=320) and 223.7 g. of a 40 SUS neutral oil was stirred and heated to a temperature of 80° C. The heat source was removed and 97.3 g. of dimethylethanolamine was added, with stirring, over a period of 1 hour. An exotherm was observed, and the temperature rose to 85°–90° C. After the addition of the dimethylethanolamine, the mixture was heated for 1 hour at 85°–95° C.

K-2 A mixture of 1000 g. of a hydrocarbyl substituted succinic anhydride (avg. MW=1700) and 1151 g. of a 40 SUS neutral oil was stirred and heated to a temperature of 65.6° C. The heat source was removed and 151 g. of dimethylethanolamine was added, with stirring, over a period of 1 hour. An exotherm was observed, and the temperature rose to 93.3° C. After the addition of the dimethylethanolamine, the mixture was heated for 1 hour at 160° C.

9 parts of K-2 were mixed with 1 part of K-1 to form the finished emulsifier.

Fertilizer Compositions:

The fertilizer compositions of the invention are water-in-oil emulsions using the emulsifiers described above. The inventive fertilizer compositions comprise a discontinuous aqueous fertilizer phase comprising at least one water soluble fertilizer component, a continuous organic phase comprising at least one oil, and an emulsifying amount of at least one of the emulsifiers of the invention. The fertilizer compositions of the present invention share some characteristics with explosive emulsions. For example, both are water-in-oil emulsions, and both may include ammonium nitrate as a component. However, the fertilizer emulsions are different from the explosive emulsions in that the ability to detonate is a necessary feature of the emulsion explosives and is an undesirable characteristic of an emulsion fertilizer. There are several methods which may be used to assure that emulsion fertilizer is non-explosive. It is important to avoid materials which may act as sensitizers in emulsion explosives. These explosive sensitizers include glass or resin microspheres or other gas containing particles, self explosive materials such as TNT, DNT, RDX and the like and various organic nitrates. Emulsion explosives may contain particulate oxygen supplying salts such as potassium perchlorate. Extra quantities of oxygen supply salts are to be avoided in fertilizer compositions. Ammonium nitrate is commonly used in emulsion explosives. It also a valuable fertilizer ingredient. Urea may be used to replace some of the ammonium nitrate. Such replacement result in an emulsion which is less explosive. The inclusion of other fertilizer components which are not oxidizing salts, such as phosphates tend to make the emulsions less explosive. By use of the one or combinations of the methods discussed above, the fertilizer compositions of the present invention may be rendered non-explosive.

The water soluble fertilizer components include the major fertilizer components which supply nitrogen, potassium and phosphorous. Optionally, various components to supply specialized nutrients may be included. Thus, if a particular soil is deficient in a trace element a useable form of this element could be included in the emulsion. Examples of such trace elements include boron, iron, manganese, sulfur, zinc, copper and molybdenum. These materials may be used in the form of their salts, or in other suitable form. If the salts are soluble, they may be incorporated in the aqueous phase, and if insoluble, they may be suspended in the emulsion. Among the major components, nitrogen may be supplied by organic material such as urea, guanidine, and their salts, as well as by inorganic materials such as ammonium nitrate, alkali metal nitrates, and alkaline earth nitrates. Potassium may be supplied by potassium salts such as carbonate, chloride, nitrate, phosphates, pyrophosphate, and sulfate. Phosphorous may be supplied by alkali and alkaline earth metal phosphate salts.

The continuous organic phase, that is oil phase, that is useful in the fertilizer emulsions of the invention may include oils from a variety of sources, including natural and synthetic oils and mixtures thereof. Hydrocarbon oils, for example, paraffinic, olefinic, naphthenic, aromatic, saturated or unsaturated hydrocarbons, may be used. In general, the oil is water-immiscible, emulsifiable and is either liquid at about 20° C. or becomes a liquid at a temperature of up to about 95° C., and preferably up to about 60° C.

Natural oils include animal oils and vegetable oils (e.g., castor oil, lard oil) as well as solvent-refined or acid-refined mineral oils of the paraffinic, naphthenic, or mixed paraffin-naphthenic types. Oils derived from coal or shale are also useful. Synthetic oils include hydrocarbon oils such as polymerized and interpolymerized olefins (e.g., polybutylenes, polypropylenes, propylene-isobutylene copolymers, chlorinated polybutylenes, etc.); alkyl benzenes (e.g., dodecylbenzenes, tetradecylbenzenes, dinonylbenzenes, di-(2-ethylhexyl)benzenes, etc.); polyphenyls (e.g., biphenyls, terphenyls, alkylated polyphenyls, etc.); and the like.

Another suitable class of synthetic oils that may be used comprises the esters of dicarboxylic acids (e.g., phthalic acid, succinic acid, alkyl succinic acid, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, pentaerythritol, etc.). Specific examples of these esters include dibutyl adipate, di(2-ethylhexyl)-sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of tinoleic acid dimer, the complex ester formed by reacting one mole of sebacic acid with two moles of tetraethylene glycol and two moles of 2-ethylhexanoic acid, and the like.

Esters useful as synthetic oils also include those made by reacting $C_5$ to $C_{24}$ monocarboxylic acids mono alcohols or polyols. The mono alcohols include $C_1$ to $C_{18}$ aliphatic alcohols. Polyols such as neopentyl glycol, trimethylol propane, pentaerythritol, dipentaerythritol, tripentaerythritol, and polyol ethers.

Unrefined, refined and rerefined oils and mixtures thereof may be used. Unrefined oils are those obtained directly from a natural or synthetic source without further purification treatment. For example, a shale oil obtained directly from a retorting operation, a petroleum oil obtained directly from distillation or ester oil obtained directly from an esterification process and used without further treatment would be an unrefined oil. Refined oils are similar to the unrefined oils except that they have been further treated in one or more purification steps to improve one or more properties. Many such purification techniques are known to those of skill in the art such as solvent extraction, distillation, acid or base extraction, filtration, percolation, etc. Rerefined oils may be used as the oil phase. Such rerefined oils are also known as reclaimed or reprocessed oils and often are obtained by processes similar to those used to obtain ordinary refined oils. These rerefined oils may be additionally processed by techniques directed toward removal of spent additives and oil breakdown products.

Examples of useful oils include a white mineral oil available from Witco Chemical Company under the trade designation KAYDOL; a white mineral oil available from Shell under the trade designation ONDINA; and a mineral oil available from Pennzoil under the trade designation N-750-HT.

The biodegradability of the oil phase is important in fertilizer compositions. Thus the more biodegradable mineral oils are favored over the heavier less biodegradable oils. Vegetable oils are favored because of their biodegradability and because of their ready availability. Usable vegetable oils include babbasu, palm, castor, olive, peanut, rapeseed, corn, sesame, coconut, cottonseed, soybean, linseed, sunflower, and safflower. It has been found that vegetable oils in general form emulsions which release the fertilizer components more quickly than emulsions prepared from mineral oils. Accordingly, the type of oil employed in preparing the emulsion may also be used to control the rate of release of the fertilizer components. Pure vegetable oil, or mixtures of vegetable oil and mineral oils may be used to obtain the exact rate of release desired.

The continuous organic phase is preferably present at a level of at least about 2% by weight, more preferably in the range of from about 2% to about 15% by weight, more preferably in the range of from about 3.5% to about 8% by weight based on the total weight of fertilizer emulsion. The discontinuous fertilizer phase is preferably present at a level of at least about 85% by weight, more preferably at a level in the range of from about 85% to about 98% by weight, more preferably from about 92% to about 96.5% by weight based on the total weight of said fertilizer emulsion. The emulsifier salt compositions of the invention are preferably present at a level in the range of from about 4% to about 40% by weight, more preferably from about 12% to about 20% by weight based on the total weight of the organic phase. The fertilizer component or components are preferably present at a level in the range of from about 70% to about 95% by weight, more preferably from about 85% to about 92% by weight, more preferably from about 87% to about 90% by weight based on the total weight of the aqueous phase. The water is preferably present at a level in the range of about 5% to about 30% by weight, more preferably about 8% to about 15% by weight, more preferably about 10% to about 13% by weight based on the weight of the aqueous phase.

The fertilizer emulsions may be prepared by dissolving the emulsifier in the oil phase, and adding the aqueous phase with stirring. The aqueous phase is prepared by dissolving the fertilizer components in water. Only moderate shear mixing is required. Both stirred and static mixers are useable in preparing the emulsions.

The fertilizer compositions may include solid fertilizer components suspended in the emulsion. The suspended components may include any of the water soluble fertilizer components noted above. Since these components are suspended in the emulsion, but are not protected by the continuous oil phase, they will be released rather quickly. By this means, a fertilizer may be prepared which provides for early release of some components, and delayed release of the rest. For example, a fertilizer could be prepared which releases some nitrogen early and delays the rest. Such a fertilizer could provide a fertilizer dosage in one application which would require two applications of conventional fertilizer. In addition, soil conditioning components, which are insoluble in water could be suspended in the fertilizer emulsion. For example powdered limestone could be suspended in the fertilizer. The limestone would serve to correct the pH balance of acid soils.

EXAMPLE 1

Fertilizer compositions were prepared by dissolving the emulsifier in the oil phase. The emulsifier made up 20% of the oil phase. Emulsifier compositions containing neutral oil as a diluent were incorporated in such a manner that the actual emulsifier level was 20% of the oil phase. Any neutral oil contained in the emulsifier composition was considered to be part of the oil phase, and replaced added oil. The oil and the emulsifier were blended at approximately 90° C. The aqueous phase was prepared by heating 150 g. of water, 400 g. ammonium nitrate, and 400 g. of urea to 82°–85° C. A 50 gram sample of the oil phase at a temperature of 90° C. was placed in a 1.5 quart plastic container. The hot aqueous phase was added, with stirring, at a temperature of 82°–85° C., to the oil phase. The addition was conducted slowly so that the aqueous phase added was assimilated before further aqueous phase was added. Generally, addition required three to seven minutes. During the addition, the mixture was stirred using a Mixmaster® mixer. During the addition, the mixer was run at 50 volts. After addition was complete, the emulsification process was completed by stirring for two minutes using the Mixmaster® mixer at 120 volts.

EXAMPLE 2

The release characteristics of the fertilizer samples prepared in example 1 were tested. There is no generally accepted method for testing the release characteristics of emulsion fertilizers. However, the following procedure has been developed to provide a method for the uniform testing of fertilizer emulsions. The emulsion is prepared and a 1.7 gram sample is taken and placed, as one lump, in a flask. 100 millimeters of water are added to the flask and the mixture is maintained at 30° C. The flask is shaken—on a Lab-Line® Orbit Environ orbital shaker at 200 RPM. Samples of the aqueous phase are withdrawn on a regular basis and analyzed by conductivity for the fertilizer component contained in the emulsion. After analysis, the aqueous sample is returned to the flask and shaking continued. A graph of the amount of the fertilizer component released versus time is prepared. The time when 10%, 20% etc. of the fertilizer component is released is estimated from the graph.

EXAMPLE A-1

The emulsifier of EXAMPLE A was formed into a fertilizer emulsion using the procedure of EXAMPLE 1. The oil was KAYDOL mineral oil. The rate of release of fertilizer components was tested according to EXAMPLE 2.

| KAYDOL & THE EMULSIFIER OF EXAMPLE A | | |
|---|---|---|
| | DAYS OF EXPOSURE | |
| % RELEASED | SAMPLE 1 | SAMPLE 2 |
| 10 | 8 | 16 |
| 20 | 16 | 22 |
| 30 | 21 | 26 |
| 40 | 24 | 30 |
| 50 | 27 | 32 |
| 60 | 30 | 34 |
| 70 | 35 | 37 |
| 80 | 37 | 39 |
| 90 | 40 | 41 |
| 100 | 42 | 42 |

EXAMPLE A-2

The emulsifier of EXAMPLE A was formed into a fertilizer emulsion using the procedure of EXAMPLE 1. The oil was Trisun® 80 high oleic acid sunflower oil. The rate of release of fertilizer components was tested according to EXAMPLE 2.

| SUNFLOWER OIL & THE EMULSIFIER OF EXAMPLE A | |
|---|---|
| % RELEASED | DAYS OF EXPOSURE |
| 10 | 1 |
| 20 | 2 |
| 30 | 3 |
| 40 | 4 |
| 50 | 6 |
| 60 | 7 |
| 70 | 8 |
| 80 | 9 |
| 90 | 10 |
| 100 | 11 |

RELEASE RATE—EXAMPLE D-1

The emulsifier of EXAMPLE D was formed into a fertilizer emulsion using the procedure of EXAMPLE 1. The oil was KAYDOL mineral oil. The rate of release of fertilizer components was tested according to EXAMPLE 2.

| KAYDOL & THE EMULSIFIER OF EXAMPLE D | |
|---|---|
| % RELEASED | DAYS OF EXPOSURE |
| 10 | 3 |
| 20 | 8 |
| 30 | 11 |
| 40 | 12 |
| 50 | 14 |
| 60 | 15 |
| 70 | 16 |
| 80 | 17 |
| 90 | 20 |
| 100 | 24 |

RELEASE RATE—EXAMPLE D-2

The emulsifier of EXAMPLE D was formed into a fertilizer emulsion using the procedure of EXAMPLE 1. The oil was Sunflower oil. The rate of release of fertilizer components was tested according to EXAMPLE 2. The emulsion released 100% of the fertilizer components within 7 days.

RELEASE RATE—EXAMPLE E-1

The emulsifier of EXAMPLE E was formed into a fertilizer emulsion using the procedure of EXAMPLE 1. The oil was KAYDOL mineral oil. The rate of release of fertilizer components was tested according to EXAMPLE 2.

| KAYDOL & THE EMULSIFIER OF EXAMPLE E | |
|---|---|
| % RELEASED | DAYS OF EXPOSURE |
| 10 | 7 |
| 20 | 9 |
| 30 | 12 |
| 40 | 14 |
| 50 | 17 |
| 60 | 20 |
| 70 | 23 |
| 80 | 26 |
| 90 | 28 |
| 100 | 31 |

RELEASE RATE—EXAMPLE F-1

The emulsifier of EXAMPLE F was formed into a fertilizer emulsion using the procedure of EXAMPLE 1. The oil was KAYDOL mineral oil. The rate of release of fertilizer components was tested according to EXAMPLE 2.

| KAYDOL & THE EMULSIFIER OF EXAMPLE F | |
|---|---|
| % RELEASED | DAYS OF EXPOSURE |
| 10 | 11 |
| 20 | 16 |
| 30 | 19 |
| 40 | 22 |
| 50 | 25 |
| 60 | 29 |
| 70 | 34 |
| 80 | 39 |
| 90 | 43 |
| 100 | 46 |

EXAMPLE F-2

The emulsifier of EXAMPLE F was formed into a fertilizer emulsion using the procedure of EXAMPLE 1. The oil was Trisun® 80 high oleic acid sunflower oil. The rate of release of fertilizer components was tested according to EXAMPLE 2.

| SUNFLOWER OIL & THE EMULSIFIER OF EXAMPLE F | |
|---|---|
| % RELEASED | DAYS OF EXPOSURE |
| 10 | 2 |
| 20 | 3 |
| 30 | 6 |
| 40 | 8 |
| 50 | 10 |
| 60 | 11 |
| 70 | 13 |
| 80 | 14 |
| 90 | 16 |
| 100 | 17 |

RELEASE RATE—EXAMPLE G-1

The emulsifier of EXAMPLE G was formed into a fertilizer emulsion using the procedure of EXAMPLE 1. The oil was KAYDOL mineral oil. The rate of release of fertilizer components was tested according to EXAMPLE 2.

| KAYDOL & THE EMULSIFIER OF EXAMPLE G | |
|---|---|
| % RELEASED | DAYS OF EXPOSURE |
| 10 | 3 |
| 20 | 5 |
| 30 | 8 |
| 40 | 11 |
| 50 | 14 |
| 60 | 17 |
| 70 | 21 |
| 80 | 23 |
| 90 | 27 |
| 100 | 29 |

RELEASE RATE—EXAMPLE I-1

The emulsifier of EXAMPLE I was formed into a fertilizer emulsion using the procedure of EXAMPLE 1. The oil was KAYDOL mineral oil. The rate of release of fertilizer components was tested according to EXAMPLE 2.

| KAYDOL & THE EMULSIFIER OF EXAMPLE I | |
|---|---|
| % RELEASED | DAYS OF EXPOSURE |
| 10 | 13 |
| 20 | 18 |
| 30 | 21 |
| 40 | 23 |
| 50 | 25 |
| 60 | 28 |
| 70 | 31 |
| 80 | 35 |
| 90 | 41 |
| 100 | 50 |

RELEASE RATE—EXAMPLE I-2

The emulsifier of EXAMPLE I was formed into a fertilizer emulsion using the procedure of EXAMPLE 1. The oil was Sunflower oil. The rate of release of fertilizer components was tested according to EXAMPLE 2.

| SUNFLOWER OIL & THE EMULSIFIER OF EXAMPLE I | |
|---|---|
| % RELEASED | DAYS OF EXPOSURE |
| 10 | 1 |
| 20 | — |
| 30 | 2 |
| 40 | — |
| 50 | 3 |
| 60 | 4 |
| 70 | 5 |
| 80 | 6 |
| 90 | 8 |
| 100 | 11 |

RELEASE RATE—EXAMPLE J-1

The emulsifier of EXAMPLE J was formed into a fertilizer emulsion using the procedure of EXAMPLE 1. The oil was KAYDOL mineral oil. The rate of release of fertilizer components was tested according to EXAMPLE 2.

| KAYDOL & THE EMULSIFIER OF EXAMPLE J | |
|---|---|
| % RELEASED | DAYS OF EXPOSURE |
| 10 | 3 |
| 20 | 6 |
| 30 | 9 |
| 40 | 11 |
| 50 | 15 |
| 60 | 19 |
| 70 | 22 |
| 80 | 25 |
| 90 | 27 |
| 100 | 30 |

RELEASE RATE—EXAMPLE J-2

The emulsifier of EXAMPLE J was formed into a fertilizer emulsion using the procedure of EXAMPLE 1. The oil was Sunflower oil. The rate of release of fertilizer components was tested according to EXAMPLE 2. The emulsion released 100% of the fertilizer components within 5 days.

RELEASE RATE—EXAMPLE K-1

The emulsifier of EXAMPLE K was formed into a fertilizer emulsion using the procedure of EXAMPLE 1. The oil was KAYDOL mineral oil. The rate of release of fertilizer components was tested according to EXAMPLE 2.

| KAYDOL & THE EMULSIFIER OF EXAMPLE K | | |
|---|---|---|
| | DAYS OF EXPOSURE | |
| % RELEASED | SAMPLE 1 | SAMPLE 2 |
| 10 | 0.5 | 1 |
| 20 | 1 | 2 |
| 30 | 1 | 3 |
| 40 | 5 | 4 |
| 50 | 12 | 10 |
| 60 | 13 | 14 |
| 70 | 15 | 19 |
| 80 | 18 | 23 |
| 90 | 23 | 27 |
| 100 | 31 | 31 |

RELEASE RATE—EXAMPLE K-2

The emulsifier of EXAMPLE K was formed into a fertilizer emulsion using the procedure of EXAMPLE 1. The oil was Sunflower oil. The emulsion which formed was unsatisfactory since it inverted to a oil in water emulsion upon cooling.

Comparative Examples

The following comparative examples illustrate the performance of the prior art emulsifiers used in emulsion fertilizer compositions.

COMPARATIVE EXAMPLE 1

A fertilizer emulsion composition was prepared using KAYDOL oil and a sorbitan mono-oleate emulsifier. The weights of ingredients and the procedure for forming the emulsion corresponded to EXAMPLE I. The rate of release of the fertilizer components was tested according to EXAMPLE 2.

| RELEASE RATE -- EXAMPLE C-1 | |
|---|---|
| % RELEASED | DAYS OF EXPOSURE |
| 20 | 0.5 |
| 50 | 1 |
| 90 | 2 |
| 100 | 3 |

COMPARATIVE EXAMPLE 2

A fertilize emulsion composition was prepared using KAYDOL oil and WITCAMIDE-511, a dimeric condensation product of oleic acid and ethanolamine, as an emulsifier. The weights of ingredients and the procedure for forming the emulsion corresponded to Example I. The rate of release of the fertilizer components was tested according to EXAMPLE 2.

| RELEASE RATE -- EXAMPLE C-2 | |
|---|---|
| % RELEASED | DAYS OF EXPOSURE |
| 20 | 0.6 |
| 40 | 1 |
| 60 | 2 |
| 80 | 2.5 |
| 100 | 4 |

COMPARATIVE EXAMPLE 3

A fertilize emulsion composition was prepared using KAYDOL oil and WITCONOL-14, a dimeric condensation product of oleic acid and glycerol, as an emulsifier. The weights of ingredients and the procedure for forming the emulsion corresponded to Example I. The rate of release of the fertilizer components was tested according to EXAMPLE 2.

| RELEASE RATE -- EXAMPLE C-3 | |
|---|---|
| % RELEASED | DAYS OF EXPOSURE |
| 20 | 1 |
| 40 | 2 |
| 60 | 3 |
| 70 | — |
| 80 | 4 |
| 90 | — |
| 100 | 5 |

Example C-4

An attempt was made to prepare a fertilizer emulsion composition was using sunflower oil and a sorbitan monooleate emulsifier. The weights of ingredients and the procedure for forming the emulsion corresponded to Example 1. An emulsion did not form.

Example C-5

An attempt was made to prepare a fertilize emulsion composition using sunflower oil and WITCAMIDE-511, a dimeric condensation product of oleic acid and ethanolamine, as an emulsifier. The weights of ingredients and the procedure for forming the emulsion corresponded to Example 1. An emulsion did not form.

Example C-6

A fertilize emulsion composition was prepared using sunflower oil and WITCONOL-14, a dimeric condensation product of oleic acid and glycerol, as an emulsifier. The weights of ingredients and the procedure for forming the emulsion corresponded to Example 1. The rate of release was tested according to example II. The emulsion released 100% of the fertilizer components within two days.

We claim:

1. A non-explosive water in oil emulsion fertilizer composition comprising:
   a discontinuous aqueous phase comprising at least one fertilizer component;
   a continuous oil phase;
   an emulsifier comprising the reaction product of at least one succinic acylating agent and at least one co-reactant selected from the group consisting of: primary alkanol amines, secondary alkanol amines, tertiary alkanol amines, primary amines, secondary amines, tertiary amines, poly-amines, alcohols, polyols, and phenols.

2. A composition according to claim 1 wherein the succinic acylating agent is a hydrocarbyl substituted succinic anhydride represented by the formula:

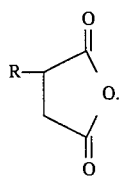

3. A composition according to claim 2 wherein the co-reactant is one or more primary alkanol amines.
4. A composition according to claim 3 wherein the primary alkanol amine is monoethanolamine.
5. A composition according to claim 2 wherein the co-reactant is one or more secondary alkanol amines.
6. A composition according to claim 5 wherein the secondary alkanol amine is diethylethanolamine.
7. A composition according to claim 2 wherein the co-reactant is one or more tertiary alkanol amines.
8. A composition according to claim 7 wherein the tertiary alkanol amine or tertiary alkanol amines are selected from the group consisting of triethanolamine, diethylethanol amine, and dimethylethanolamine.
9. A composition according to claim 2 wherein the co-reactant is one or more primary amines.
10. A composition according to claim 2 wherein the co-reactant is one or more secondary amines.
11. A composition according to claim 10 wherein the secondary amine is morpholine.
12. A composition according to claim 2 wherein the co-reactant is one or more tertiary amines.
13. A composition according to claim 2 wherein the co-reactant is one or more poly-amines.
14. A composition according to claim 13 wherein the poly-amine or poly-amines are selected from the group consisting of polyalkylene amines.
15. A composition according to claim 13 wherein the reaction product of the succinic acylating agent and the poly-amine or poly-amines is further reacted with an acid to form a salt.
16. A composition according to claim 15 wherein the acid is oleic acid.
17. A composition according to claim 2 wherein the co-reactant is one or more alcohols.

18. A composition according to claim 17 wherein the alcohol is isopropyl alcohol.

19. A composition according to claim 17 wherein the reaction product of the succinic acylating agent and the alcohol is further reacted with ammonia, an amine, or a metal to form a salt.

20. A composition according to claim 2 wherein the co-reactant is one or more polyols.

21. A composition according to claim 20 wherein the polyol or polyols are selected from the group consisting of ethylene glycol, propylene glycol, trimethylol propane, and pentaerythritol.

22. A composition according to claim 20 wherein the reaction product of the succinic acylating agent and the polyol is further reacted with ammonia, an amine, or a metal to form a salt.

23. A composition according to claim 1 wherein the succinic acylating agent is a hydrocarbyl substituted succinic acid represented by the formula:

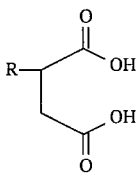

24. A composition according to claim 23 wherein the co-reactant is one or more primary alkanol amines.

25. A composition according to claim 24 wherein the primary alkanol amine is monoethanolamine.

26. A composition according to claim 23 wherein the co-reactant is one or more secondary alkanol amines.

27. A composition according to claim 26 wherein the secondary alkanol amine is diethylethanolamine.

28. A composition according to claim 23 wherein the co-reactant is one or more tertiary alkanol amines.

29. A composition according to claim 28 wherein the tertiary alkanol amine or tertiary alkanol amines are selected from the group consisting of triethanolamine, diethylethanol amine, and dimethylethanolamine.

30. A composition according to claim 23 wherein the co-reactant is one or more primary amines.

31. A composition according to claim 23 wherein the co-reactant is one or more secondary amines.

32. A composition according to claim 31 wherein the secondary amine is morpholine.

33. A composition according to claim 23 wherein the co-reactant is one or more tertiary amines.

34. A composition according to claim 23 wherein the co-reactant is one or more poly-amines.

35. A composition according to claim 34 wherein the poly-amine or poly-amines are selected from the group consisting of polyalkylene amines.

36. A composition according to claim 34 wherein the reaction product of the succinic acylating agent and the poly-amine or poly-amines is further reacted with an acid to form a salt.

37. A composition according to claim 36 wherein the acid is oleic acid.

38. A composition according to claim 23 wherein the co-reactant is one or more alcohols.

39. A composition according to claim 38 wherein the alcohol is isopropyl alcohol.

40. A composition according to claim 38 wherein the reaction product of the succinic acylating agent and the alcohol is further reacted with ammonia, an amine, or a metal to form a salt.

41. A composition according to claim 23 wherein the co-reactant is one or more polyols.

42. A composition according to claim 41 wherein the polyol or polyols are selected from the group consisting of ethylene glycol, propylene glycol, trimethylol propane, and pentaerythritol.

43. A composition according to claim 41 wherein the reaction product of the succinic acylating agent and the polyol is further reacted with ammonia, an amine, or a metal to form a salt.

44. A composition according to claim 1 wherein the succinic acylating agent is represented by the formulae:

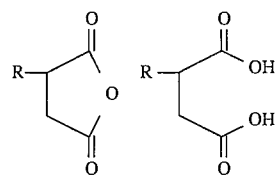

wherein R is said hydrocarbyl substituent of containing from about 10 to 500 carbon atoms.

45. A composition according to claim 44 wherein the co-reactant is one or more primary alkanol amines.

46. A composition according to claim 45 wherein the primary alkanol amine is monoethanolamine.

47. A composition according to claim 44 wherein the co-reactant is one or more secondary alkanol amines.

48. A composition according to claim 47 wherein the secondary alkanol amine is diethanolamine.

49. A composition according to claim 44 wherein the co-reactant is one or more tertiary alkanol amines.

50. A composition according to claim 49 wherein the tertiary alkanol amine or tertiary alkanol amines are selected from the group consisting of triethanolamine, diethylethanol amine, and dimethylethanolamine.

51. A composition according to claim 44 wherein the co-reactant is one or more primary amines.

52. A composition according to claim 44 wherein the co-reactant is one or more secondary amines.

53. A composition according to claim 52 wherein the secondary amine is morpholine.

54. A composition according to claim 44 wherein the co-reactant is one or more tertiary amines.

55. A composition according to claim 44 wherein the co-reactant is one or more poly-amines.

56. A composition according to claim 55 wherein the poly-amine or poly-amines are selected from the group consisting of polyalkylene amines.

57. A composition according to claim 56 wherein the reaction product of the succinic acylating agent and the poly-amine or poly-amines is further reacted with an acid to form a salt.

58. A composition according to claim 57 wherein the acid is oleic acid.

59. A composition according to claim 44 wherein the co-reactant is one or more alcohols.

60. A composition according to claim 59 wherein the alcohol is isopropyl alcohol.

61. A composition according to claim 59 wherein the reaction product of the succinic acylating agent and the alcohol is further reacted with ammonia, an amine, or a metal to form a salt.

62. A composition according to claim 44 wherein the co-reactant is one or more polyols.

63. A composition according to claim 62 wherein the polyol or polyols are selected from the group consisting of ethylene glycol, propylene glycol, trimethylol propane, and pentaerythritol.

64. A composition according to claim 62 wherein the reaction product of the succinic acylating agent and the polyol is further reacted with ammonia, an amine, or a metal to form a salt.

65. A composition according to claim 1 wherein the succinic acylating agent is a substituted succinic acylating agents having from 1.0 to about 4.5 succinic groups for each equivalent weight of substituent group.

66. A composition according to claim 65 wherein the co-reactant is one or more primary alkanol amines.

67. A composition according to claim 66 wherein the primary alkanol amine is monoethanolamine.

68. A composition according to claim 65 wherein the co-reactant is one or more secondary alkanol amines.

69. A composition according to claim 68 wherein the secondary alkanol amine is diethanolamine.

70. A composition according to claim 65 wherein the co-reactant is one or more tertiary alkanol amines.

71. A composition according to claim 70 wherein the tertiary alkanol amine or tertiary alkanol amines are selected from the group consisting of triethanolamine, diethylethanol amine, and dimethylethanolamine.

72. A composition according to claim 65 wherein the co-reactant is one or more primary amines.

73. A composition according to claim 65 wherein the co-reactant is one or more secondary amines.

74. A composition according to claim 73 wherein the secondary amine is morpholine.

75. A composition according to claim 65 wherein the co-reactant is one or more tertiary amines.

76. A composition according to claim 65 wherein the co-reactant is one or more poly-amines.

77. A composition according to claim 76 wherein the poly-amine or poly-amines are selected from the group consisting of polyalkylene amines.

78. A composition according to claim 76 wherein the reaction product of the succinic acylating agent and the poly-amine or poly-amines is further reacted with an acid to form a salt.

79. A composition according to claim 78 wherein the acid is oleic acid.

80. A composition according to claim 65 wherein the co-reactant is one or more alcohols.

81. A composition according to claim 80 wherein the alcohol is isopropyl alcohol.

82. A composition according to claim 80 wherein the reaction product of the succinic acylating agent and the alcohol is further reacted with ammonia, an amine, or a metal to form a salt.

83. A composition according to claim 65 wherein the co-reactant is one or more polyols.

84. A composition according to claim 83 wherein the polyol or polyols are selected from the group consisting of ethylene glycol, propylene glycol, trimethylol propane, and pentaerythritol.

85. A composition according to claim 83 wherein the reaction product of the succinic acylating agent and the polyol is further reacted with ammonia, an amine, or a metal to form a salt.

86. A non-explosive water in oil emulsion fertilizer composition comprising:

a discontinuous aqueous phase comprising at least one fertilizer component;

a continuous oil phase;

an emulsifier comprising:

(A) at least one salt moiety derived from at least one high-molecular weight substituted succinic acylating agent, said acylating agent having at least one hydrocarbyl substituent having an average of from about 20 to about 500 carbon atoms, and (A)(II) ammonia, at least one amine, at least one alkali or alkaline earth metal, and/or at least one alkali or alkaline earth metal compound;

(B) at least one salt moiety derived from at least one low-molecular weight succinic acylating agent, said acylating agent having at least one hydrocarbyl substituent having an average of up to about 18 carbon atoms, and (B)(II) ammonia, at least one amine, at least one alkali or alkaline earth metal, and/or at least one alkali or alkaline earth metal compound;

said components (A) and (B) being coupled together by (C) at least one compound having (i) two or more primary amino groups, (ii) two or more secondary amino groups, (iii) at least one primary amino group and at least one secondary amino group, (iv) at least two hydroxyl groups or (v) at least one primary or secondary amino group and at least one hydroxyl group.

87. The composition of claim 86 wherein said hydrocarbyl substituent of (A)(I) has an average of from about 30 to about 500 carbon atoms.

88. The composition of claim 86 wherein said hydrocarbyl substituent of (A)(I) has an average of from about 40 to about 500 carbon atoms.

89. The composition of claim 86 wherein said hydrocarbyl substituent of (A)(I) has an average of from about 50 to about 500 carbon atoms.

90. The composition of claim 86 wherein said hydrocarbyl substituent of (A)(I) is a poly(isobutylene) group.

91. The composition of claim 86 wherein component (A)(II) and (B)(II) are independently selected from the group consisting of at least one monoamine, at least one polyamine, at least one primary, secondary, tertiary amine, at least one primary, secondary, tertiary alkanol amine, and at least one N-(hydroxyl-substituted hydrocarbyl)amine.

92. The composition of claim 86 wherein component (A)(II) and (B)(II) comprise dimethylethanolamine.

93. The composition of claim 86 wherein component (A)(II) and (B)(II) comprise ammonia.

94. The composition of claim 86 wherein component (A)(II) and (B)(II) comprise at least one alkali metal.

95. The composition of claim 86 wherein component (C) comprises, at least one polyamine, at least one polyol, at least one polyhydroxy aromatic compound, at least one primary or secondary alkanol amine, or at least one N-(hydroxyl-substituted hydrocarbyl) primary or secondary amine.

\* \* \* \* \*